United States Patent
Irikura

(10) Patent No.: US 7,331,412 B2
(45) Date of Patent: Feb. 19, 2008

(54) VEHICLE HAVING TWIN TRANSMISSIONS FOR DRIVING RESPECTIVE WHEELS

(75) Inventor: Koji Irikura, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 42 days.

(21) Appl. No.: 11/327,415

(22) Filed: Jan. 9, 2006

(65) Prior Publication Data
US 2006/0108155 A1 May 25, 2006

Related U.S. Application Data

(62) Division of application No. 10/455,306, filed on Jun. 6, 2003, now Pat. No. 7,004,268.

(51) Int. Cl.
*B62D 11/04* (2006.01)

(52) U.S. Cl. .................. 180/6.3; 180/6.48; 180/6.66; 180/307

(58) Field of Classification Search ............... 180/6.2, 180/6.3, 6.48, 6.66, 307, 305, 336
See application file for complete search history.

(56) References Cited

U.S. PATENT DOCUMENTS

| | | | | |
|---|---|---|---|---|
| 2,495,101 | A | * | 1/1950 | Hoff .................... 180/6.66 |
| 2,996,135 | A | | 8/1961 | Grabow |
| 3,550,708 | A | | 12/1970 | Paramythioti |
| 3,744,584 | A | | 7/1973 | Swift |
| 4,494,621 | A | * | 1/1985 | Nagata ................... 180/6.2 |
| 4,577,714 | A | * | 3/1986 | Tokunaga ............... 180/308 |
| 5,497,847 | A | | 3/1996 | Ota et al. |
| 5,590,737 | A | | 1/1997 | Azuma et al. |
| 6,361,463 | B1 | * | 3/2002 | Kojima .................... 475/79 |
| 6,601,663 | B2 | | 8/2003 | Hauser |
| 7,004,268 | B2 | * | 2/2006 | Irikura .................... 180/6.3 |

2001/0040057 A1  11/2001  Hasegawa et al.

(Continued)

FOREIGN PATENT DOCUMENTS

JP           52-29036       *   3/1977

(Continued)

*Primary Examiner*—Anne Marie Boehler
(74) *Attorney, Agent, or Firm*—Sterne, Kessler, Goldstein & Fox P.L.L.C.

(57) ABSTRACT

A vehicle comprises a vehicle frame, a prime mover mounted on the vehicle frame, a laterally turnable wheel disposed at one side of the vehicle frame, a pair of drive wheels disposed at the other side of the vehicle frame, a steering operation device, a traveling operation device for setting the traveling speed and direction of the vehicle, and a pair of transmissions for controlling the rotary speed and direction of the respective drive wheels. The transmissions are operationally connected with the steering operation device so as to create a difference of rotary speed between the drive wheels according to operation of the steering operation device. The transmissions are operationally connected with the traveling operation device so as to drive the drive wheels in a common rotary direction from their stationary state according to operation of the traveling operation device. A clutch is interposed between the transmissions so as to connect the drive wheels with each other when the steering operation device is set in a straight traveling position. Based on setting of a switching device for switching the traveling direction of the vehicle between forward and rearward, a reverser decides the rotational direction of the drive wheels.

2 Claims, 13 Drawing Sheets

U.S. PATENT DOCUMENTS

| | | |
|---|---|---|
| 2002/0092685 A1 | 7/2002 | Hauser |
| 2002/0100630 A1* | 8/2002 | Evans et al. ................ 180/307 |
| 2003/0102171 A1 | 6/2003 | Hauser |
| 2003/0201134 A1 | 10/2003 | Ishii et al. |
| 2004/0060745 A1* | 4/2004 | Umemoto et al. ......... 180/6.48 |

FOREIGN PATENT DOCUMENTS

| | | |
|---|---|---|
| JP | 2000-25637 | 1/2000 |
| JP | 3176237 | 4/2001 |

* cited by examiner

VEHICLE HAVING TWIN TRANSMISSIONS FOR DRIVING RESPECTIVE WHEELS

CROSS-REFERENCE TO RELATED APPLICATION

The present application is a divisional of U.S. application Ser. No. 10/455,306, filed Jun. 6, 2003, now U.S. Pat. No. 7,004,268 which is hereby incorporated herein by reference in its entirety.

BACKGROUND OF THE INVENTION

1. Field of the Invention

The present invention relates to a vehicle equipped with a pair of transmissions, e.g., a pair of hydrostatic transmissions (HSTs), a pair of belt type continuous variable transmissions (CVTs), or a pair of electric motors, for driving respective left and right drive wheels, wherein the pair of transmissions, which surely drive the vehicle straight when they are set so, are operated for left and right turning of the vehicle so that one of the left and right drive wheels is accelerated and the other is decelerated, and wherein each of the left and right turning directions of the vehicle always coincides with the manipulated leftward or rightward direction of a steering operation device whether the vehicle travels forward or rearward.

2. Related Art

There is a well-known vehicle having twin parallel transmissions, such as HSTs, for driving respective left and right drive wheels. For left and right turning of the vehicle, one of the transmissions accelerates the corresponding drive wheel (on an outside of turning), and the other decelerates the other drive wheel (on an inside of turning). For example, if a steering wheel serving as a steering operation device of the vehicle is turned left, one transmission decelerates the left drive wheel, and the other accelerates the right drive wheel, whereby the vehicle turns left.

Incidentally, if the deceleration force applied on the inside drive wheel becomes relatively larger than the traveling force thereof, the rotational direction of the inside drive wheel is reversed. Then, the deceleration force becomes an acceleration force for the rotationally reversed inside drive wheel.

Also, unless the steering wheel is operated for turning, the traveling speed and direction of the vehicle can be changed by operation of a speed change operation device such as a pedal or a lever so that both the transmissions drive both the drive wheels at equal rotary speed. If the steering wheel is turned for turning, the rotary speed of one drive wheel becomes higher than the equal rotary speed, and that of the other drive wheel becomes lower than the equal rotary speed.

However, the vehicle having the twin transmissions still has such a problem as follows: When it is assumed that the left drive wheel is decelerated and the right wheel accelerated by turning the steering wheel leftward during the forward traveling of the vehicle, the steering wheel must be turned rightward for left turning during the rearward traveling of the vehicle because the acceleration force for a forwardly rotating wheel serves as a deceleration force for a rearwardly rotating wheel. Such an operation of the steering wheel is so illusional as to cause the vehicle to turn to a wrong side.

As means for coincidence of turning side of a vehicle with a steering direction whether the vehicle travels forward or rearward, Japanese Laid Open Gazette No. 2000-25,637 discloses mechanical means interposed among a transmission, a steering operation device and a speed changing operation device, and Japanese Patent No. 3,176,237 discloses a hydraulic switching valve provided in an HST for steering. However, while each of the two Japanese documents discloses a pair of HSTs for driving two rotors, one of the HSTs is provided for traveling so as to rotate both the rotors at various equal speeds, and the other HST is provided for steering so as to accelerate one rotor and decelerate the other rotor. Therefore, each of the above-mentioned disclosed means does not correspond to the vehicle driving system comprising a pair of transmissions for driving respective right and left drive wheels. Furthermore, while the rotors disclosed in Japanese Laid Open Gazette No. 2000-25,637 are drive wheels, those disclosed in Japanese Patent No. 3,176,237 are sprockets.

For another problem of the vehicle comprising the twin transmissions for driving respective drive wheels, even if the vehicle is provided with a driving direction changing system which ensures that one drive wheel on inside of the turning vehicle is decelerated and the other on outside thereof is accelerated in correspondence to the turning side of the steering operation device such as a steering wheel whether the vehicle travels forward and rearward, the performances of the parallel transmissions must be strictly equal to each other so as to ensure a straight traveling when the steering wheel is set in the straight traveling position. If there is a slight performance difference between the transmissions, the drive wheels rotate at different speeds so as to turn the vehicle while the steering wheel is in the straight traveling position, or a complicated and troublesome adjustment of a linkage from the steering wheel to the transmissions must be performed. Moreover, the differential driving of left and right drive wheels is not requested in such a case where the vehicle travels on a rough road or one of the drive wheels slumps into mud.

For solving this kind of problem, U.S. Pat. No. 5,590,737 discloses a crawler vehicle equipped with a driving system comprising a pair of HSTs for driving respective right and left sprockets, wherein a differential-locking clutch is provided so as to lock the sprockets with each other at need. However, this U.S. Patent does not disclose a pair of transmissions for driving respective right and left drive wheels.

SUMMARY OF THE INVENTION

An object of the present invention is to provide a vehicle including a prime mover, left and right drive wheels, and twin parallel transmissions for driving the respective drive wheels, wherein the vehicle is made user-friendly by such a driving direction changing system as to ensure that each of left and right turning directions of the vehicle corresponding to the manipulated direction of the steering operation device is constant whether the vehicle travels forward or rearward.

To achieve the object, the vehicle according to the present invention comprises a traveling operation device for setting a traveling speed of the vehicle and selecting a traveling direction of the vehicle between forward and rearward, which is operationally connected with the pair of transmissions so as to drive the drive wheels at a common speed and in a common direction, and a steering operation device for turning the vehicle leftward or rightward, wherein the steering operation device is operationally connected with the pair of transmissions so as to accelerate one of drive wheels at outside of the turning vehicle and to decelerate the other drive wheel at inside of the turning vehicle. The vehicle further comprises switching means for switching the traveling direction of the vehicle between forward and rearward selected by the traveling operation device, and reversing means provided to the pair of transmissions so as to reverse driving directions of the respective drive wheels in correspondence to the switching operation of the switching means.

As an aspect for arrangement of the reversing means, in case that the vehicle includes a common input shaft shared between the transmissions to receive power of the prime mover, the reversing means is preferably interposed among the common input shaft and the pair of input shafts of the respective transmissions.

As another aspect for arrangement of the reversing means, the reversing means may be interposed between each of output shafts of the respective transmissions and each of the drive wheels.

Assuming that a vehicle includes (1) a prime mover, left and right drive wheels, and twin parallel transmissions for driving the respective drive wheels, (2) a traveling operation device for setting a traveling speed of the vehicle and selecting a traveling direction of the vehicle between forward and rearward, which is operationally connected with the pair of transmissions so as to drive the drive wheels at a common speed and in a common direction, and, (3) a steering operation device for turning the vehicle leftward or rightward, which is operationally connected with the pair of transmissions so as to accelerate one of the drive wheels at outside of the turning vehicle and to decelerate the other drive wheel at inside of the turning vehicle whether the vehicle travels forward or rearward, a second object of the present invention is to ensure both the drive wheels rotate at the same speed for exact straight traveling of the vehicle when the steering operation device is set so the vehicle travels in a straight direction, in spite of some performance differences between the transmissions.

To achieve the second object, the vehicle according to the present invention comprises a differential locking clutch for the drive wheels. The differential locking clutch is engaged to lock the drive wheels with each other when the steering operation device is set to make the vehicle travel straight, and wherein the differential locking clutch is disengaged to unlock the drive wheels from each other when the steering operation device is set to make the vehicle travel leftward or rightward.

These, further and other objects, features and advantages will appear more fully from the following description taken in connection with the accompanying drawing.

BRIEF DESCRIPTION OF THE
DRAWINGS/FIGURES

Figure 5:
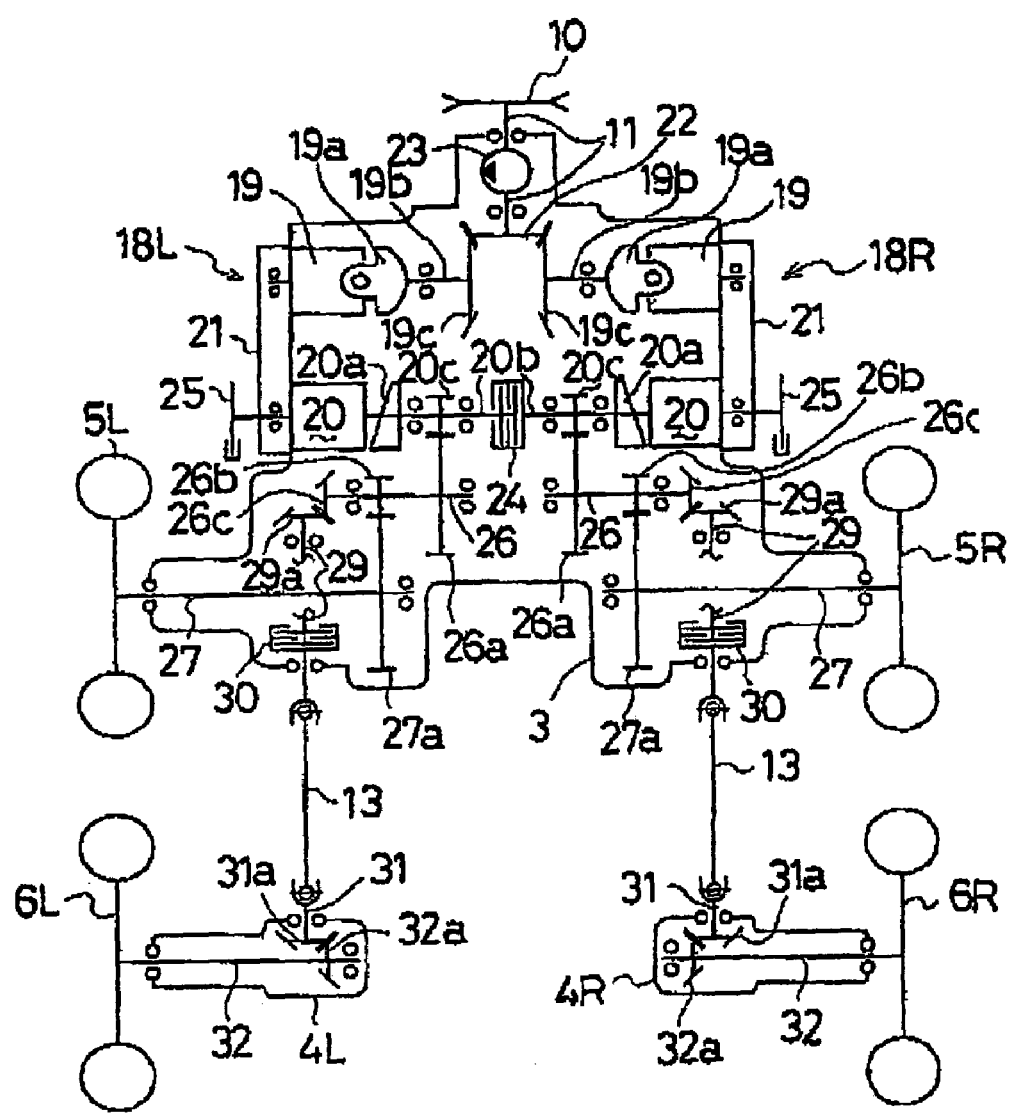
FIG. 5 is a diagram of a wheel driving system for a vehicle according to the present invention, including twin transmissions for driving respective left and right drive wheels independently, wherein a differential-locking clutch is provided so as to connect the left and right drive wheels to each other when a steering wheel is set in a straight traveling position.
Figure 6:
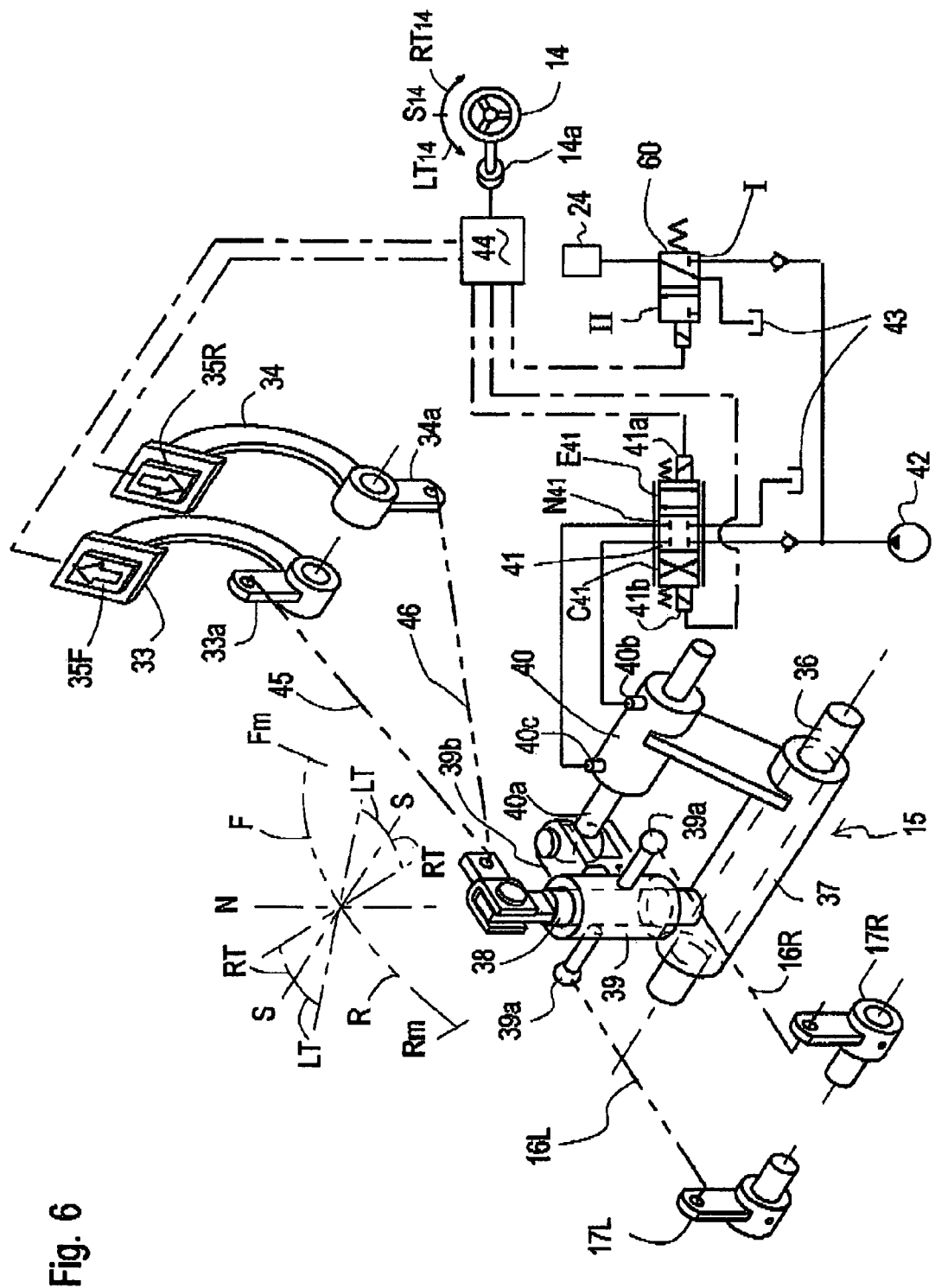

FIG. 6 illustrates a perspective view of a mechanical linkage for controlling left and right speed control levers of the respective twin transmissions, together with a diagram of hydraulic and electric circuit for controlling the speed control levers and the differential locking clutch, wherein the linkage and the hydraulic and electric circuit are provided for the wheel driving system shown in FIG. 5.

Figure 7:
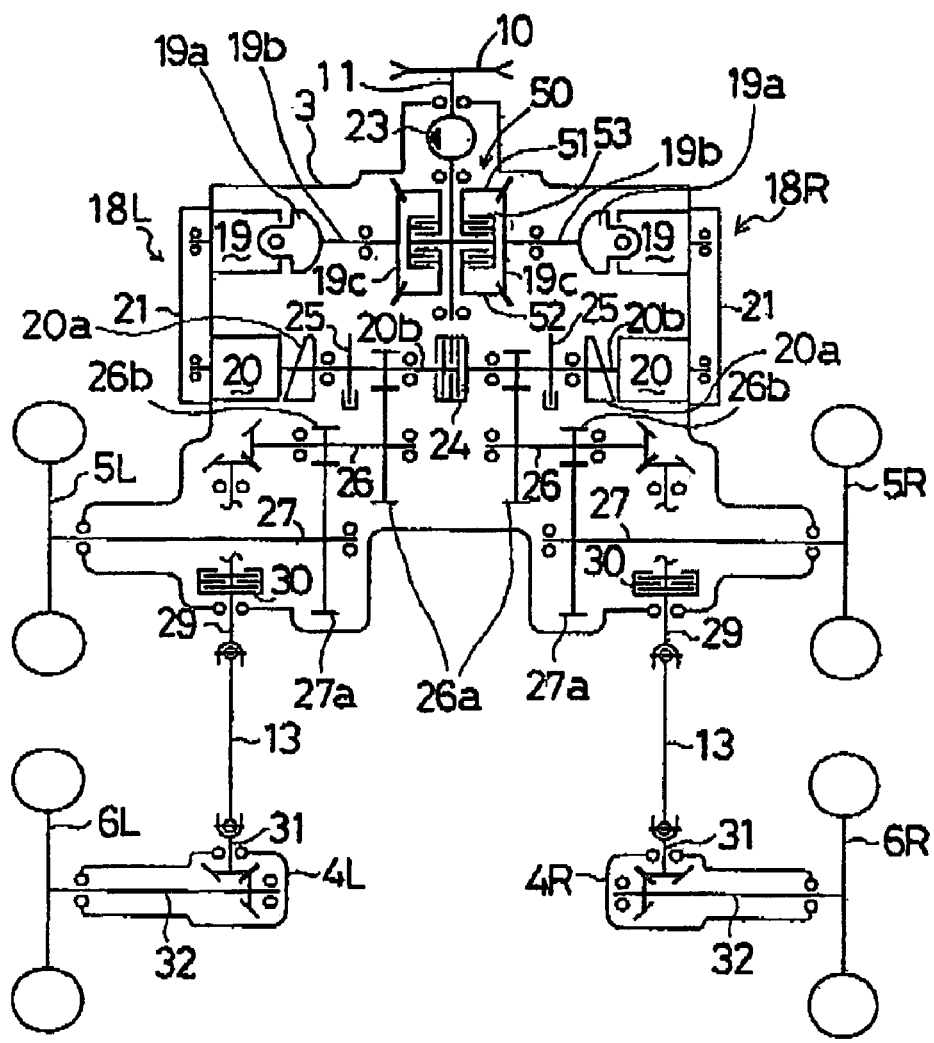

FIG. 7 is a diagram of another wheel driving system for a vehicle according to the present invention, including twin transmissions for driving respective left and right drive wheels independently, wherein a differential-locking clutch is provided so as to connect left and right drive wheels to each other when a steering wheel is set in a straight traveling position, and a reversing mechanism (a reverser) is provided among a primary input shaft and respective input shafts of the twin transmissions.

Figure 8:
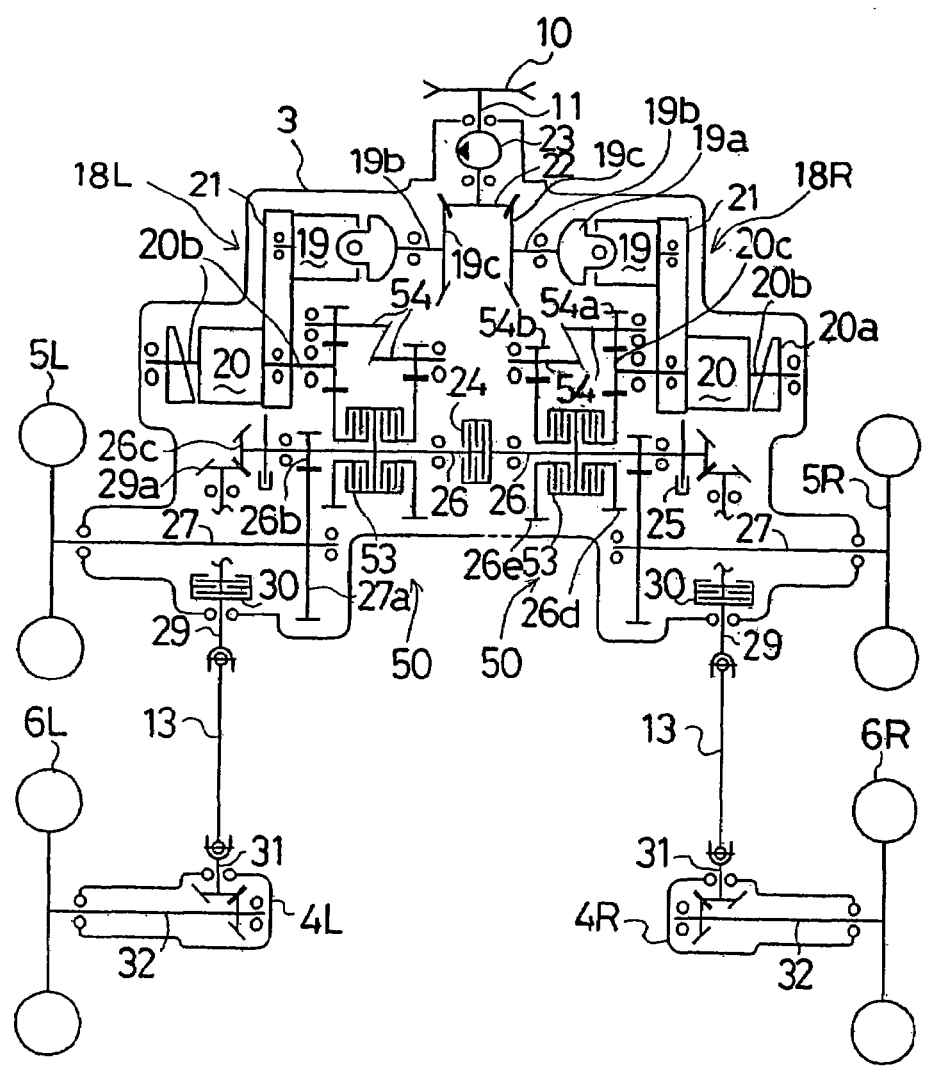

FIG. 8 is a diagram of another wheel driving system for a vehicle according to the present invention, including twin transmissions for driving respective left and right drive wheels independently, wherein a differential-locking clutch is provided so as to connect left and right drive wheels to each other when a steering wheel is set in a straight traveling position, and a reverser is interposed between an output shaft of each transmission and each drive wheel.

Figure 9:
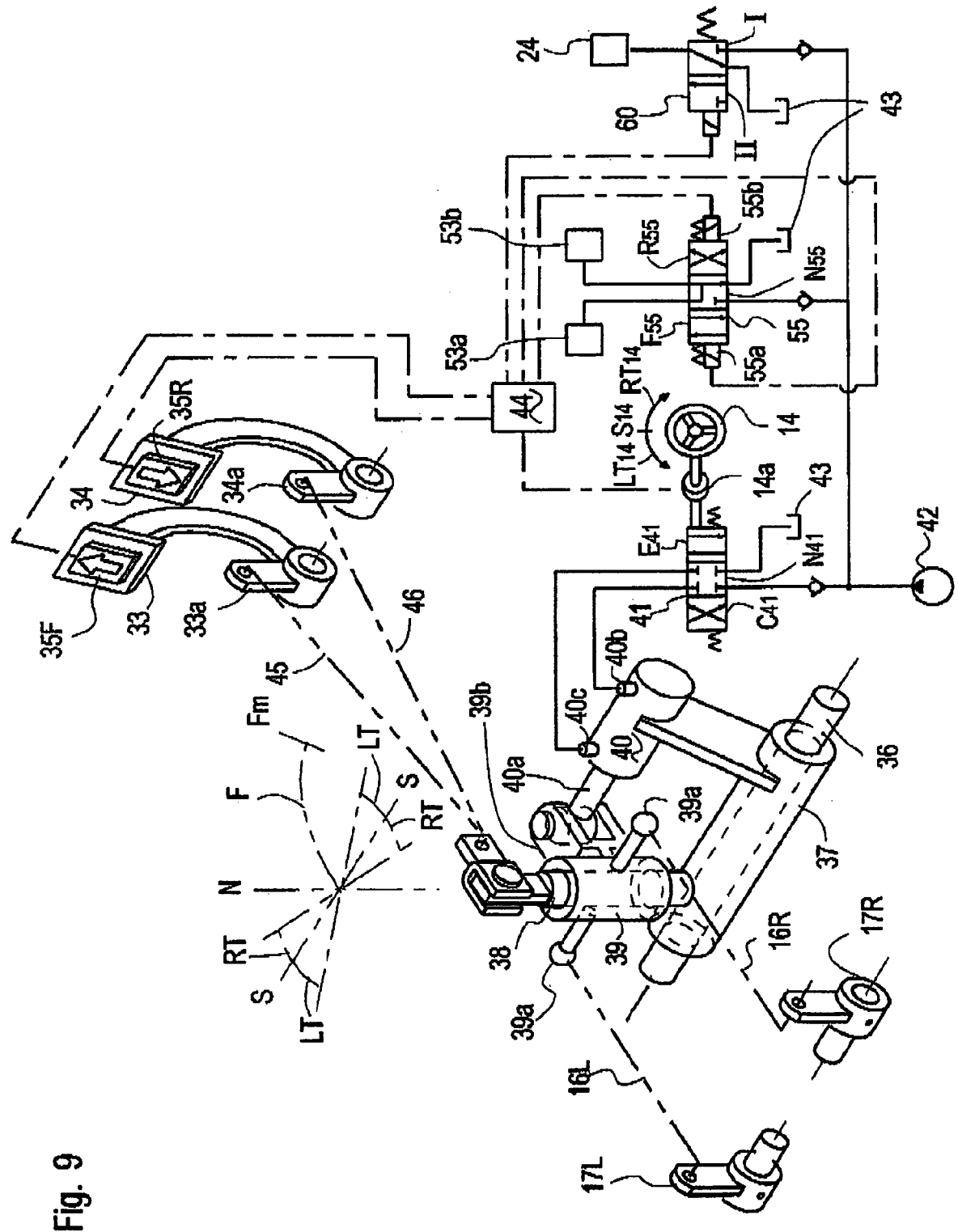

FIG. 9 is a perspective view of a mechanical linkage for controlling left and right speed control levers of the respective twin transmissions, together with a diagram of hydraulic and electric circuit for controlling the speed control levers, the differential locking clutch and the reverser, wherein the linkage and the hydraulic and electric circuit are provided for any of the wheel driving systems shown in FIGS. 7 and 8.

Figure 10:
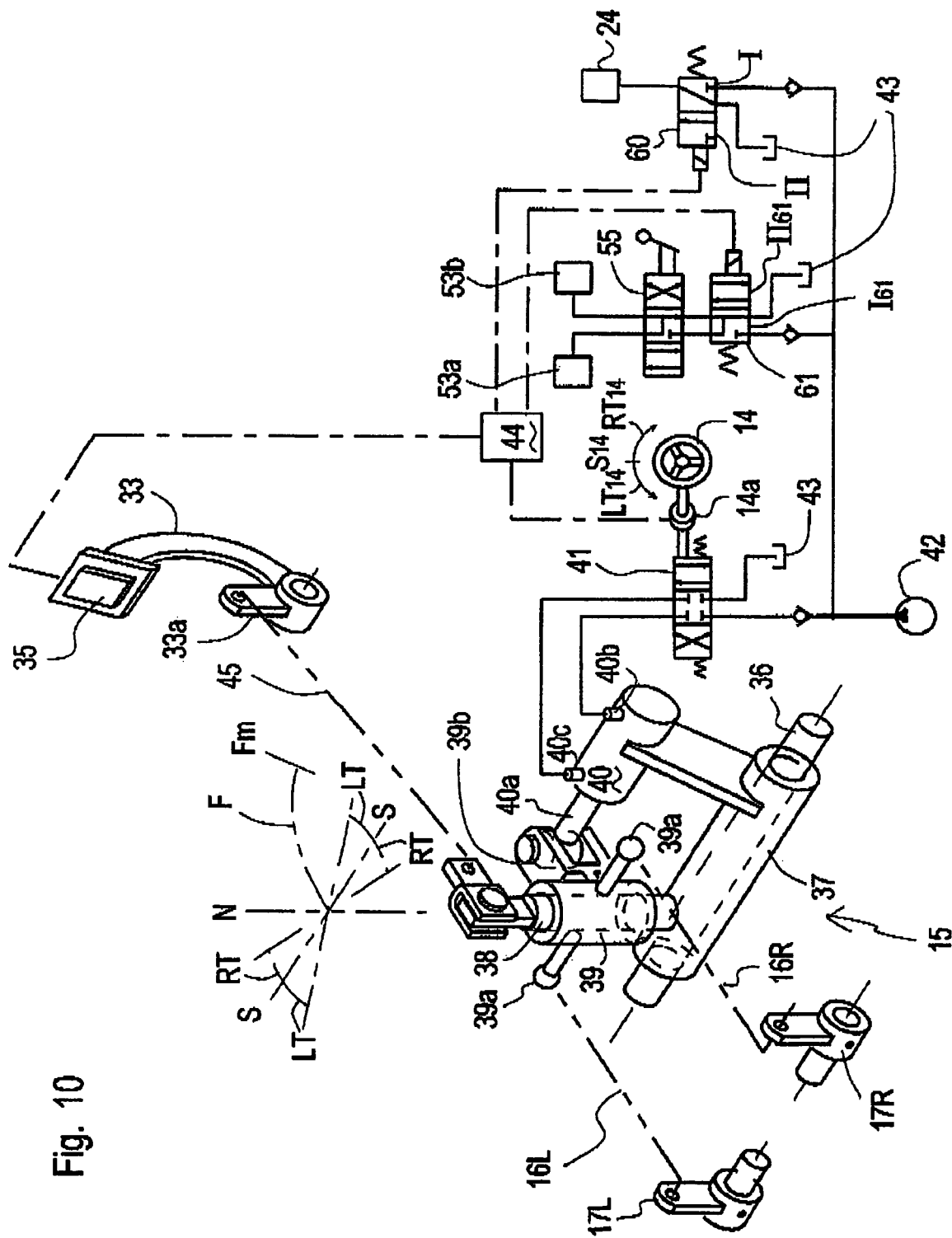

FIG. 10 is a perspective view of the mechanical linkage of FIG. 9, having an alternative reverser control system.

Figure 11:
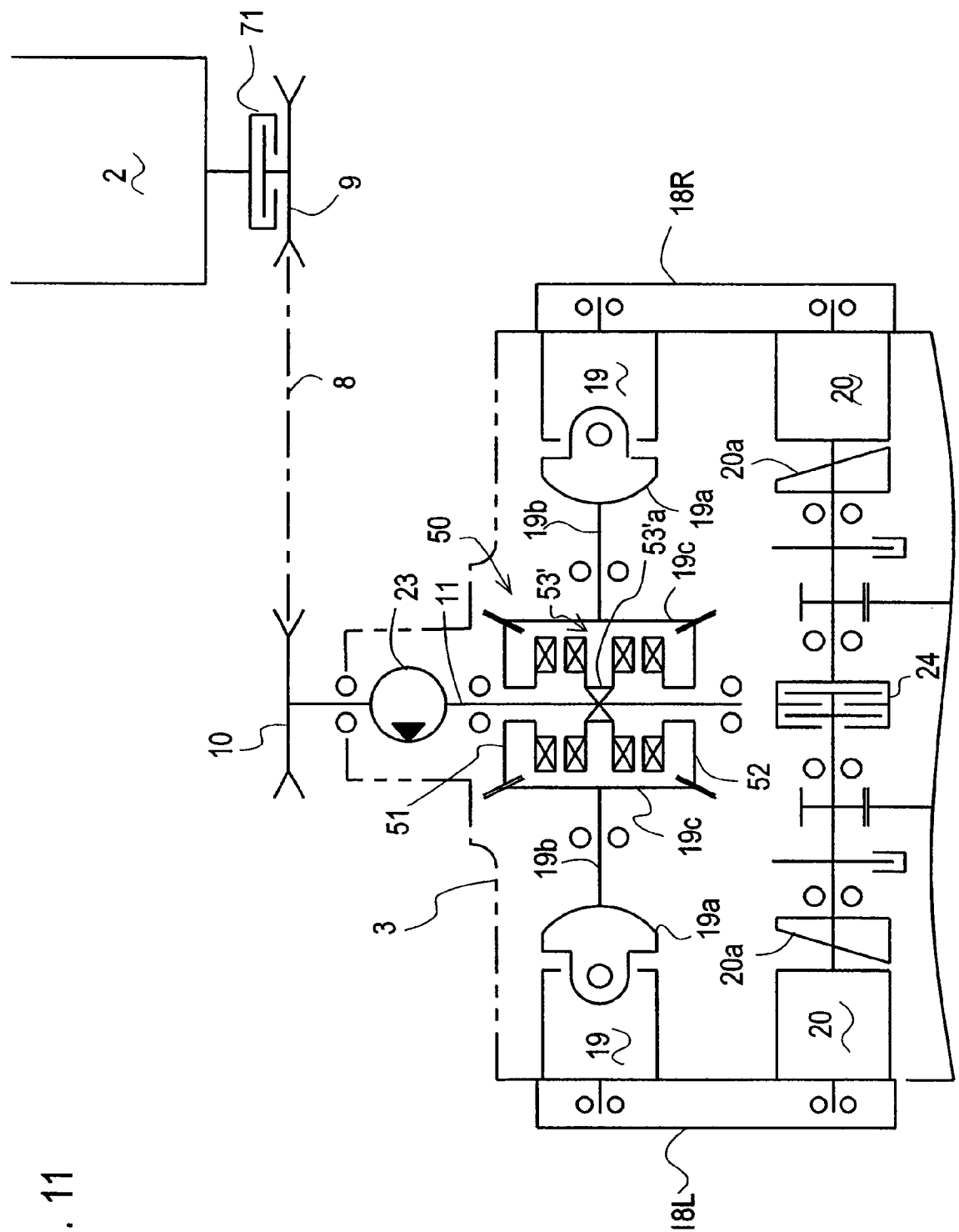

FIG. 11 is a diagram of the wheel driving system of FIG. 7, having an alternative reverser clutch formation.

Figure 12:
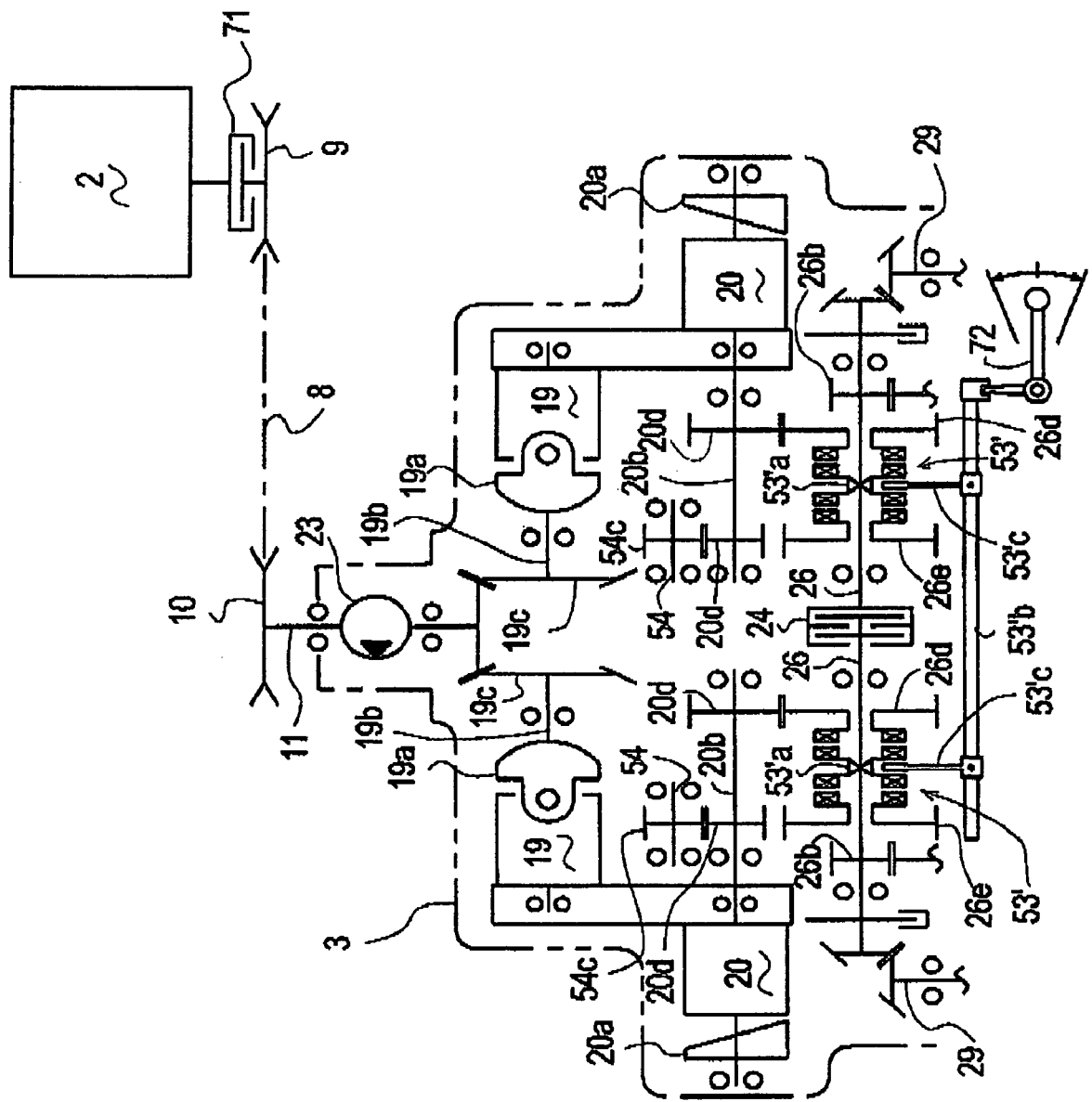

FIG. 12 is a diagram of the wheel driving system of FIG. 8, having an alternative reverser clutch formation.

Figure 13:
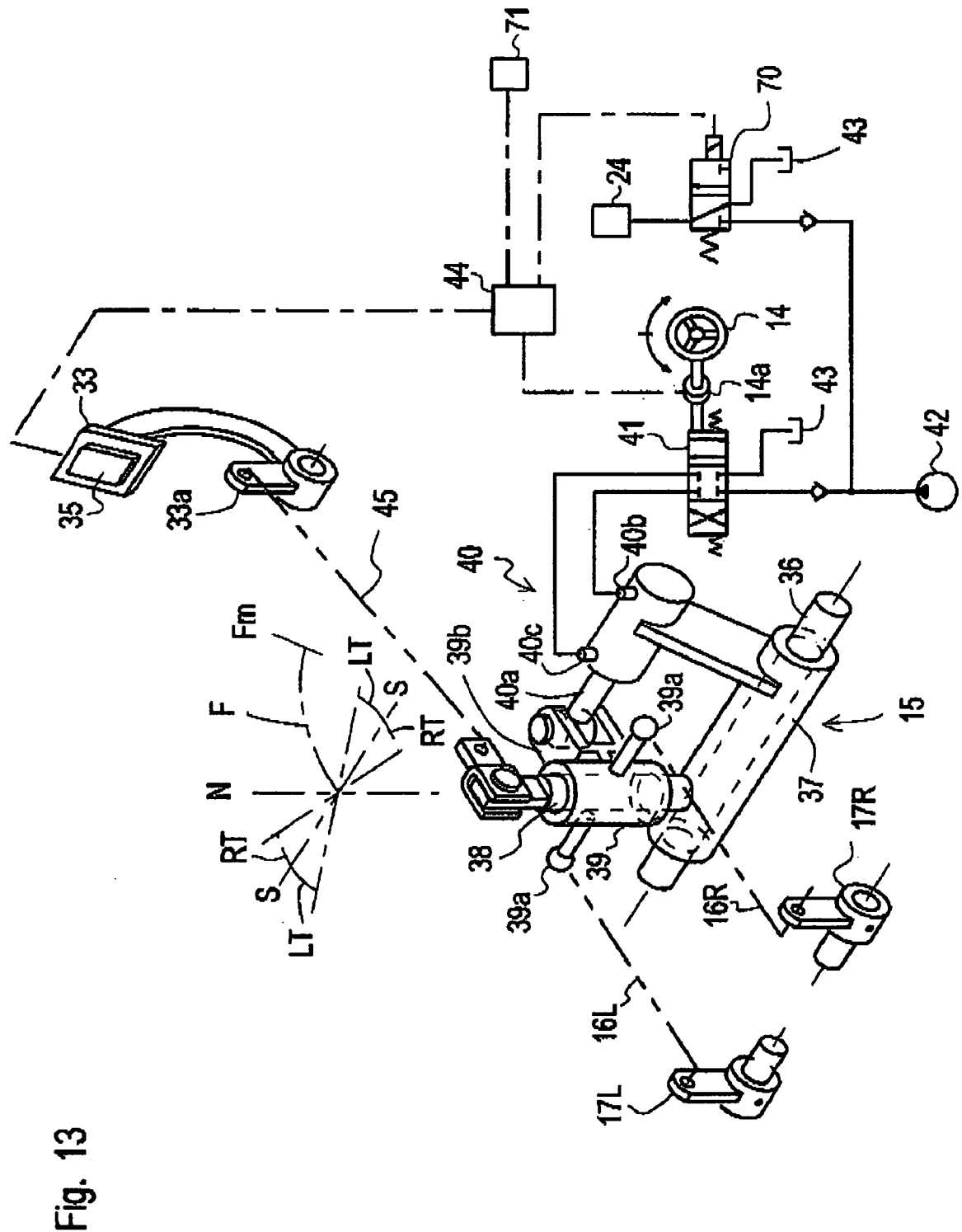

FIG. 13 is a perspective view of a mechanical linkage for controlling left and right speed control levers of the respective twin transmissions, together with a diagram of hydraulic and electric circuit for controlling the speed control levers and the differential locking clutch, wherein the linkage and the hydraulic and electric circuit are provided for any of the wheel driving systems shown in FIGS. 11 and 12.

DETAILED DESCRIPTION OF THE
INVENTION

Figure 1:
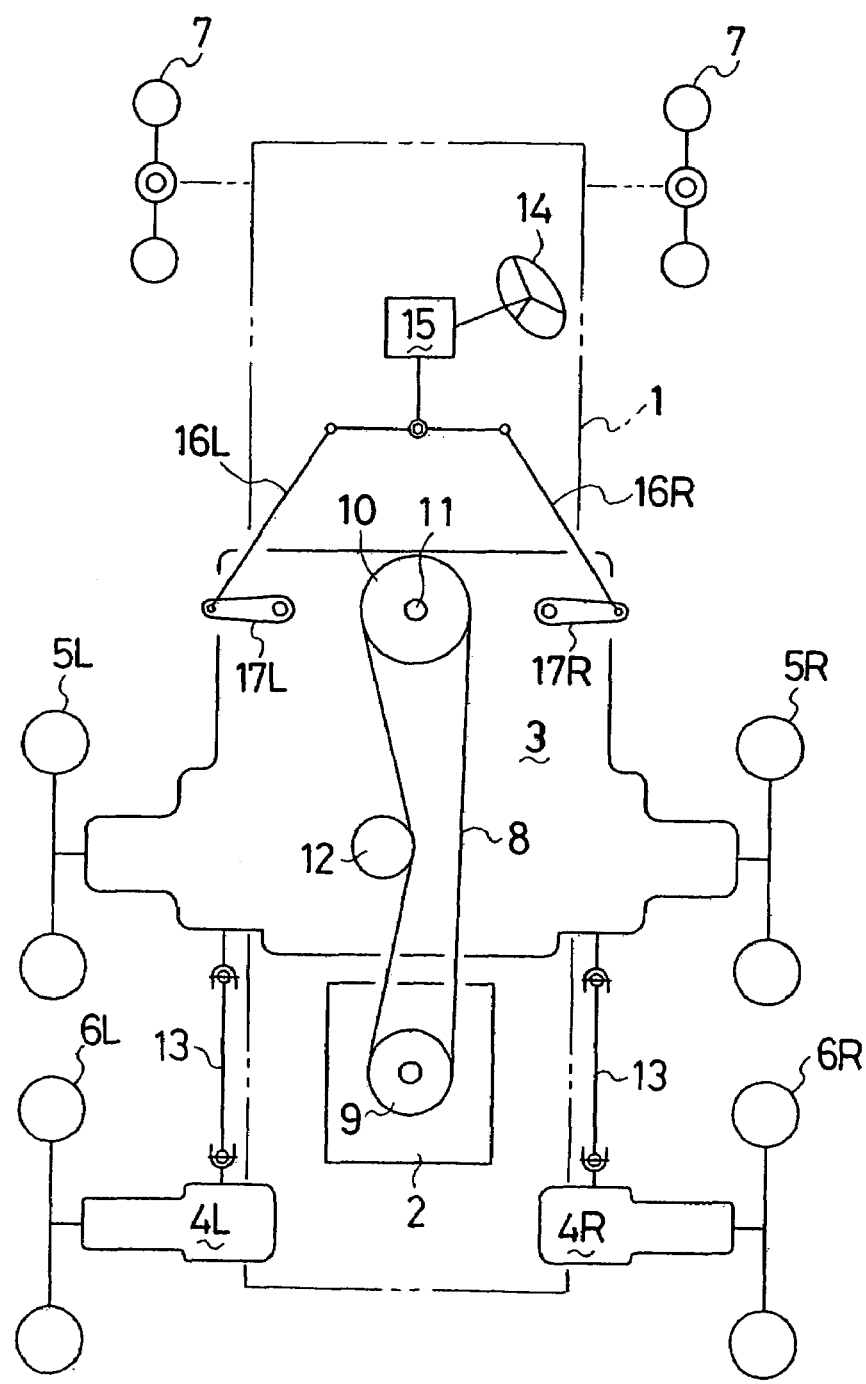
FIG. 1 is a schematic plan view of a six-wheel vehicle according to the present invention, including a steering wheel, two front casters, two middle drive wheels, and two rear drive wheels, wherein the middle and rear drive wheels are not steerable.

Referring to FIG. 1, a six-wheel vehicle has a vehicle frame 1, on which a vertical crankshaft engine 2, a transmission housing 3 and left and right axle casings 4L and 4R are mounted. Left and right drive wheels 5L and 5R are disposed on left and right sides of transmission housing 3, respectively. Left and right drive wheels 6L and 6R are disposed behind respective drive wheels 5L and 5R. Left and right casters 7 are supported (alternatively, only one caster 7 or more than two casters 7 may be supported) by a front portion of vehicle frame 1 so as to serve as laterally turnable driven wheels, which are free from driving power of engine 2 and turn to a lateral side coinciding with a turning side of a steering wheel 14 serving as a steering operation device. Thus, in this vehicle, casters 7 serve as front wheels, drive wheels 5L and 5R as middle wheels, and drive wheels 6L and 6R as rear wheels. However, positions of these wheels may be changed in the longitudinal direction of the vehicle, e.g., drive wheels 6L and 6R may serve as front wheels, and casters 7 as rear wheels.

A belt 8 is interposed between an engine output pulley 9 of vertical crankshaft engine 2 and a primary input pulley 10 fixed on a primary input shaft 11 projecting from transmission housing 3 so as to transmit power from engine 2 to a transmission system in transmission housing 3. Additionally, belt 8 is looped over a tension pulley 12 to be tensioned.

The transmission system in transmission housing 3 comprises left and right power take-off portions which transmit power to left and right axle casings 4L and 4R through respective propeller shafts 13, thereby driving drive wheels 6L and 6R.

Left and right speed control levers 17L and 17R are pivoted on transmission housing 3. Steering wheel 14 is operationally connected to speed control levers 17L and 17R through a power steering system 15 and respective links 16L and 16R.

Figure 2:
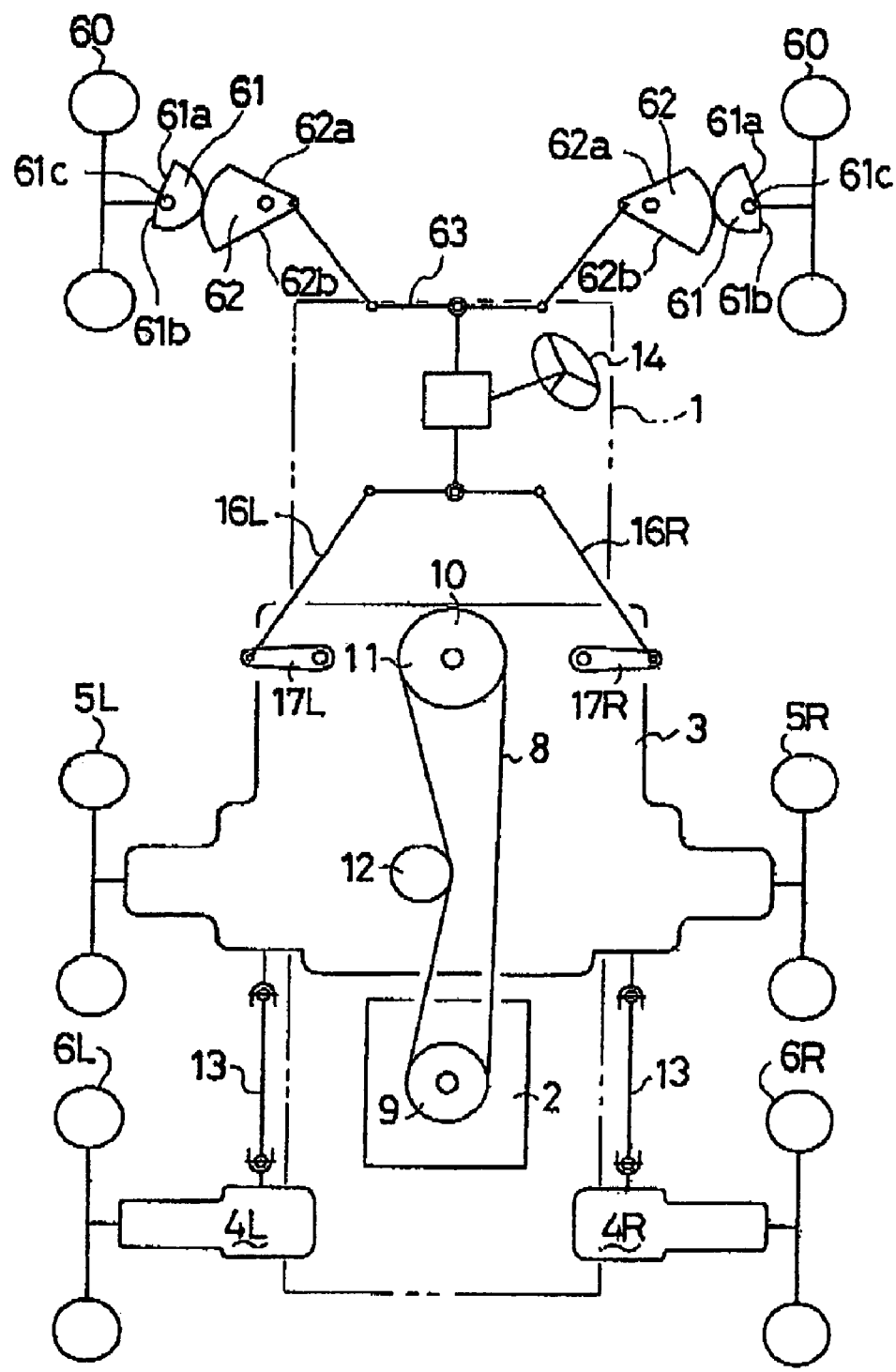
FIG. 2 is a schematic plan view of another six-wheel vehicle according to the present invention, including a steering wheel, two steerable front driven wheels, two middle drive wheels, and two rear drive wheels, wherein the middle and rear drive wheels are not steerable.

Referring to FIG. 2, left and right steerable driven wheels 60, serving as the laterally turnable wheels as mentioned above, mechanically interlock with steering wheel 14. A pivot (a king pin) of each driven wheel 60 is connected to a pivot 61c of each of two small sector gears 61. Each small sector gear 61 has a front edge 61a and a shorter rear edge 61b. Pivot 61c is disposed extremely adjacent to an end of gear 61 where both edges 61a and 61b are gathered. On the other hand, an axle housing for supporting both driven wheels 60 is provided at each of left and right ends thereof with each of two large sector gears 62 supported rotatably around respective vertical pivots. Each large sector gear 62 has a front edge 62a and a longer rear edge 62b. An end of gear 62 where both edges 62a and 62b are gathered is pivotally connected to each of left and right ends of a tie rod 63 interlocking with steering wheel 14.

Large sector gears 62 serving as drive gears mesh with respective small sector gears 61 serving as follower gears. A distance of a serrated periphery of each gear 61 from pivot 61c (hereinafter, the distance is referred to as a "radius") gradually decreases while it passes from front edge 61a to rear edge 61b. As compensating for the decrease of the radius of gear 61, a distance of a serrated periphery of each gear 62 from the end of gear 62 pivotally connected to tie rod 63, i.e., a radius of gear 62 gradually increases while it passes from front edge 62a to rear edge 62b.

As each driven wheel 60 laterally turns so as to turn its front end to the proximal side of the vehicle, meshing gears 61 and 62 are rotated so that front edges 61a and 62a approach each other, whereby a gear ratio of small sector gear 61 to large sector gear 62 increases. On the contrary, as the rear end of driven wheel 60 turns proximally, rear edges 61b and 62b approach each other so as to decrease the gear ratio of gear 61 to gear 62. Consequently, during the turning of the vehicle, driven wheel 60 on lateral inside of the turning vehicle is turned at a larger angle than driven wheel 60 on lateral outside of the turning vehicle. Thus, similarly to a vehicle having a caster, the vehicle can turn on a small circle swiftly even if the angle of steering wheel 14 is not very large. Moreover, the vehicle is more advantageous than a vehicle having a caster in that a driver can comprehend the direction of driven wheels 60 and stably operate the vehicle on a slope because steering wheel 14 is always connected to driven wheels 60.

Figure 3:
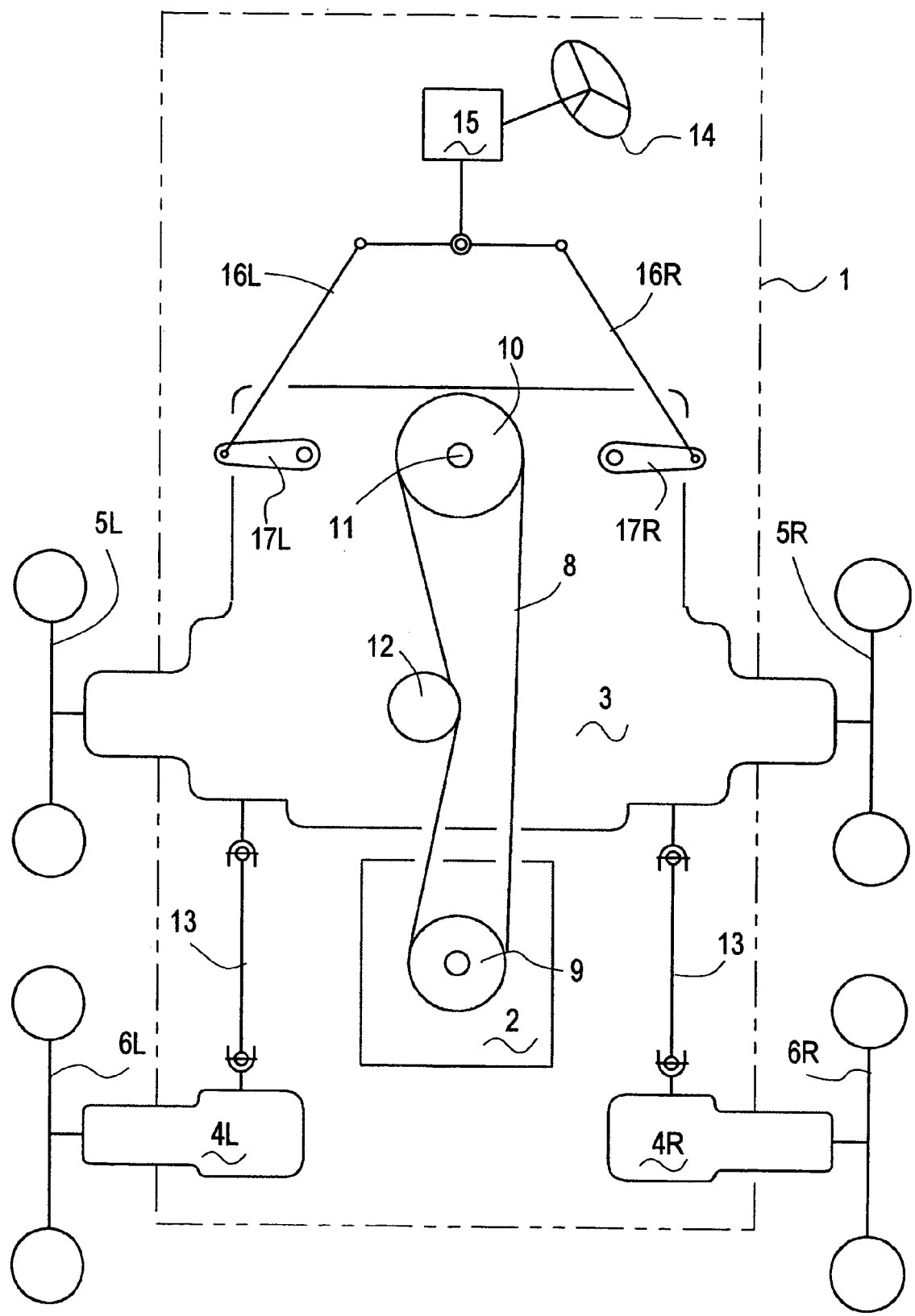
FIG. 3 is a schematic plan view of a four-wheel vehicle according to the present invention, including a steering wheel, two front drive wheels, and two rear drive wheels, wherein the four drive wheels are not steerable.

Referring to FIG. 3, a skid steering type four-wheel vehicle has left and right front drive wheels 5L and 5R and left and right rear drive wheels 6L and 6R, wherein none of the four wheels are steerable. Steering wheel 14 serving as a steering operation device is manipulated so as to locate left and right speed control levers 17L and 17R. The vehicle selectively travels straight or turns left or right, depending upon whether or not the rotary speed of left drive wheels 5L and 6L determined by the location of left speed control lever 17L coincides with that of right drive wheels 5R and 6R determined by the location of right speed control lever 17R.

Figure 4:
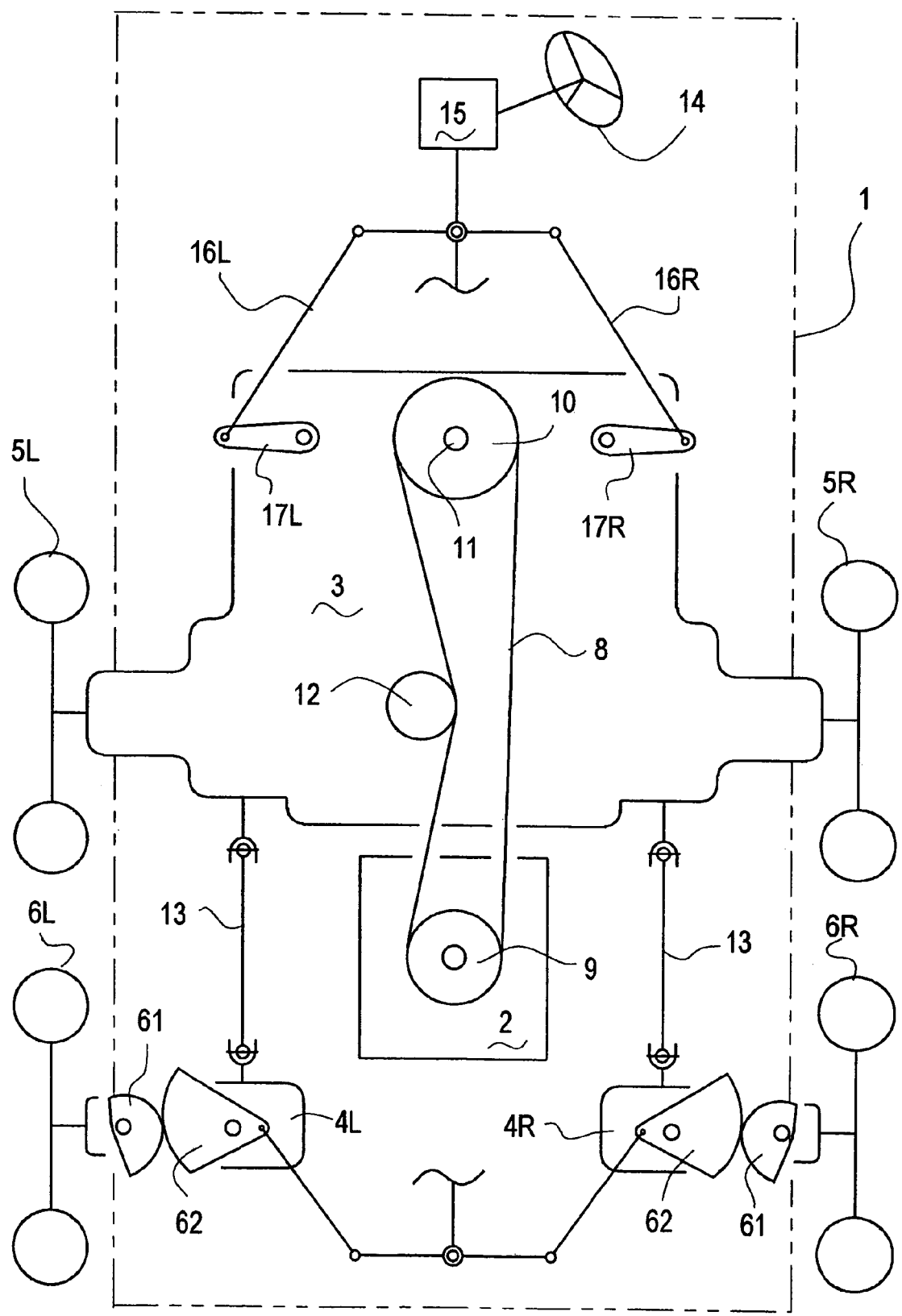
FIG. 4 is a schematic plan view of another four-wheel vehicle according to the present invention, including a steering wheel, two front drive wheels which are not steerable, and two steerable rear drive wheels.

Referring to FIG. 4, a four-wheel vehicle has left and right front drive wheels 5L and 5R and left and right steerable rear drive wheels 6L and 6R. Steering wheel 14 is operationally connected to drive wheels 6L and 6R through a linkage which is similar with that of FIG. 2.

Referring to FIG. 5, in transmission housing 3, left and right HSTs 18L and 18R are disposed oppositely to each other. Each of HSTs 18L and 18R comprises a hydraulic pump 19 including a movable swash plate 19a, and a hydraulic motor 20 including a fixed swash plate 20a. Hydraulic pump 19 and hydraulic motor 20 are fluidly connected with each other through a center section 21. Speed control levers 17L and 17R interlock with respective movable swash plates 19a (See FIG. 4).

Pump shafts 19b of both hydraulic pumps 19 are extended toward each other. Bevel gears serving as HST input gears 19c are fixed onto ends of pump shafts 19b facing each other, respectively. An upper wall of transmission housing 3 rotatably supports primary input shaft 11 vertically. Abovementioned primary input pulley 10 is fixed onto the outer end of primary input shaft 11. A bevel gear 22 is fixed onto the other inner end of primary input shaft 11 and meshes with both HST input gears 19c. Incidentally, primary input shaft 11 penetrates charge pump 23 so as to serve as a drive shaft of charge pump 23.

Alternatively, if an engine has a horizontal crankshaft, primary input shaft 11 is supported horizontally by transmission housing 3. An outer end of horizontal primary input shaft 11 penetrating charge pump 23 may be extended outward from transmission housing 3 so as to serve as a PTO shaft for driving a working machine attached to the vehicle.

Motor shafts 20b of both HSTs 18L and 18R are extended toward each other and connected/disconnected through a differential locking clutch 24. Oppositely to differential locking clutch 24, each motor shaft 20b projects from center section 21 so as to be provided thereon with a brake 25. Differential locking clutch 24 is a spring-loaded hydraulic clutch, which is engaged by spring force and disengaged by hydraulic pressure overcoming the spring force. The hydraulic pressure for disengaging differential locking clutch 24 is applied by fluid supplied by a later-discussed electric and hydraulic circuit.

Each of drive wheels 5L and 5R is fixed to each of left and right drive axles 27 rotatably supported by transmission housing 3. Motor shafts 20b engage with respective counter shafts 26 through deceleration gears 20c and 26a. Counter shafts 26 engage with respective drive axles 27 through deceleration gears 26b and 27a. Left and right drive axles 27 project laterally outward from transmission housing 3 oppositely to each other and are provided on their outer ends with respective drive wheels 5L and 5R.

Each counter shaft 26 is extended outward in transmission housing 3 so as to be fixedly provided on its distal end with a bevel gear 26c, which meshes with a bevel gear 29a fixed on an inner end of each of left and right PTO shafts 29. Each PTO shaft 29 projects rearward from transmission housing 3 so as to be joined to propelling shaft 13 through a universal joint.

In each of axle casings 4L and 4R, a horizontal input shaft 31 and a horizontal drive axle 32 are rotatably supported mutually perpendicularly and engage with each other through bevel gears 31a and 32a fixed onto respective shafts 31 and 32. Input shaft 31 projects outward from each of axle casings 4L and 4R so as to be joined to propelling shaft 13 through a universal joint. Drive axles 32 project laterally outward from respective axle casings 4L and 4R oppositely to each other and are provided on their outer ends with respective drive wheels 6L and 6R.

Each PTO shaft 29 is intermediately provided with a clutch 30. Clutches 30 are engaged or disengaged so as to put the vehicle into either a four-wheel drive (4WD) mode or a two-wheel drive (2WD) mode.

Referring to FIG. 6, a structure of power steering system 15 (see FIG. 1) for controlling speed control levers 17L and 17R will be described. A forward traveling shift pedal 33 and a rearward traveling shift pedal 34 (together, the traveling operation device) are juxtaposed above a footboard on the vehicle. A pressure-sensing switch 35F is disposed on forward traveling shift pedal 33 so as to be switched on by a driver's foot when pedal 33 is depressed. A pressure-sensing switch 35R is disposed on rearward traveling shift pedal 34 so as to be switched on by a driver's foot when pedal 34 is depressed.

A support shaft 36 is disposed horizontally and fixed to a vehicle body such as vehicle frame 1. A sleeve 37 is relatively rotatably disposed around support shaft 36. A shaft 38 is fixedly extended upward from sleeve 37 radially about shaft 36. A sleeve 39 is relatively rotatably provided around shaft 38. A top of shaft 38 projects upward from sleeve 39.

An arm 33a fixedly projects upward from a boss of forward traveling shift pedal 33 serving as a pivot of pedal 33. A link 45 is connected at one end thereof to arm 33a so as to be pulled by depression of pedal 33. An arm 34a fixedly projects downward from a boss of rearward traveling shift pedal 34 serving as a pivot of pedal 34. A link 46 is connected at one end thereof to arm 34a so as to be pushed by depression of pedal 34. Links 45 and 46 are joined at the other ends thereof to the top of shaft 38.

When neither pedal 33 nor 34 is depressed, sleeve 37 is biased by neutral-returning springs (not shown) interposed in respective links 45 and 46 so as to locate shaft 38 at a neutral position N. By depressing pedal 33, link 45 pulls the top of shaft 38 so as tilt shaft 38 forward from neutral position N to a maximum forward traveling speed position Fm in forward traveling range F in correspondence to the depth of depressed pedal 33. By depressing pedal 34, link 46 pushes the top of shaft 38 so as to tilt shaft 38 rearward from neutral position N to a maximum rearward traveling speed position Rm in rearward traveling range R in correspondence to the depth of depressed pedal 34. Thus, by depressing either pedal 33 or 34, shaft 38 is rotated forward or rearward together with sleeve 37 around shaft 36.

A pair of opposite traverse bars 39a are fixedly extended from sleeve 39 radially about shaft 38. Bars 39a are connected at utmost ends thereof to respective links 16L and 16R extended from speed control levers 17L and 17R. Consequently, either pedal 33 or 34 is depressed so as to tilt sleeve 39 together with shaft 38 forward or rearward and move the utmost ends of traverse bars 39a with links 16L and 16R forward or rearward, thereby rotating speed control levers 17L and 17R to an equal degree.

By depressing forward traveling shift pedal 33, both levers 17L and 17R are pulled and rotated from their neutral positions through links 16L and 16R, thereby rotating movable swash plates 19a of HSTs 18L and 18R so as to accelerate drive wheels 5L and 5R forward. On the contrary, by depressing rearward traveling shift pedal 34, both levers 17L and 17R are pushed and rotated from their neutral positions through links 16L and 16R, thereby rotating movable swash plates 19a of HSTs 18L and 18R so as to accelerate drive wheels 5L and 5R rearward.

A double-acting hydraulic cylinder 40 is disposed horizontally in parallel to shaft 36, and its cylinder casing is fixed to sleeve 37. A piston rod 40a of cylinder 40 is connected to sleeve 39 through an arm 39b extended radially (perpendicularly to bars 39a) from sleeve 39. Sleeve 39 is rotated in relative to shaft 38 by telescopic motion of piston rod 40a. Consequently, one bar 39a pulls corresponding one of levers 17L and 17R, and the other bar 39a pushes the other lever 17R or 17L, so that one of drive wheels 5L and 5R is accelerated, and the other decelerated. However, if one drive wheel 5L or 5R is rotated forward and the other rearward, both drive wheels 5L and 5R are accelerated in respective forward and rearward directions.

Hereinafter, the movement of piston rod 40a pushing arm 39b is defined as extension movement increasing the stroke thereof, and the movement of piston rod 40a pulling arm 39b as contraction movement decreasing the stroke thereof.

By a later-discussed steering valve 41, the stroke of piston rod 40a is controlled to correspond to a set rotational position of steering wheel 14. However, the corresponding position of steering wheel 14 differs due to whether the vehicle travels forward or rearward, i.e., whether pedal 33 or 34 is depressed.

When steering wheel 14 is set at a straight traveling position $S_{14}$, the stroke piston rod 40a becomes a neutral stroke. At this time, bars 39a are oriented in a direction S for straight traveling of the vehicle relative to shaft 38 at any place.

When piston rod 40a is extended from the neutral stroke to increase the stroke thereof, sleeve 39 is rotated so that bars 39a are rotated in shown ranges LT to respective maximum rotational positions LTm symmetrically with respect to shaft 38. That is, left bar 39a rotates rearward from direction S so as to push left speed control lever 17L rearward, and right bar 39a rotates forward from direction S so as to pull right speed control lever 17R forward.

If shaft 38 is disposed in forward traveling range F where both swash plates 19a of left and right hydraulic pumps 19 are tilted in their ranges for forward traveling, rearwardly pushed left lever 17L reduces the tilt angle of swash plate 19a linked therewith so as to reduce the capacity of left hydraulic pump 19, thereby decelerating left drive wheel 5L. Simultaneously, forwardly pulled right lever 17R increases the tilt angle of swash plate 19a linked therewith so as to increase the capacity of right hydraulic pump 19, thereby accelerating right drive wheel 5R. Therefore, the vehicle turns left.

If shaft 38 is disposed in rearward traveling range R where both swash plates 19a of left and right hydraulic pumps 19 are tilted in their ranges for rearward traveling, rearwardly pushed left lever 17L increases the tilt angle of swash plate 19a linked therewith so as to increase the capacity of left hydraulic pump 19, thereby accelerating left drive wheel 5L. Simultaneously, forwardly pulled right lever 17R reduces the tilt angle of swash plate 19a linked therewith so as to reduce the capacity of right hydraulic pump 19, thereby decelerating right drive wheel 5R. Therefore, the vehicle turns right.

When piston rod 40a is contracted from the neutral stroke to decrease the stroke thereof, sleeve 39 is rotated so that bars 39a are rotated in shown ranges RT to respective maximum rotational positions RTm symmetrically with respect to shaft 38. That is, left bar 39a rotates forward from direction S so as to pull left speed control lever 17L forward, and right bar 39a rotates rearward from direction S so as to push right speed control lever 17R rearward.

If shaft 38 is disposed in forward traveling range F where both swash plates 19a of left and right hydraulic pumps 19 are tilted in their ranges for forward traveling, forwardly pulled left lever 17L increases the tilt angle of swash plate 19a linked therewith so as to increase the capacity of left hydraulic pump 19, thereby accelerating left drive wheel 5L. Simultaneously, rearwardly pushed right lever 17R reduces the tilt angle of swash plate 19a linked therewith so as to reduce the capacity of right hydraulic pump 19, thereby decelerating right drive wheel 5R. Therefore, the vehicle turns right.

If shaft 38 is disposed in rearward traveling range R where both swash plates 19a of left and right hydraulic pumps 19 are tilted in their ranges for rearward traveling, forwardly pulled left lever 17L reduces the tilt angle of swash plate 19a linked therewith so as to reduce the capacity of left hydraulic pump 19, thereby decelerating left drive wheel 5L. Simultaneously, rearwardly pushed right lever 17R increases the tilt angle of swash plate 19a linked therewith so as to increase the capacity of right hydraulic pump 19, thereby accelerating right drive wheel 5R. Therefore, the vehicle turns left.

A steering valve 41 connects each of ports 40b and 40c of cylinder 40 to either pump 42 or tank 43. Steering valve 41 is an electro-magnetically controlled hydraulic (servo) valve having oppositely active solenoids 41a and 41b, which is switched among three positions, i.e., a neutral position $N_4$, an extension position $E_{41}$ and a contraction position $C_{41}$. In this regard, if a detected value about an actual position (stroke) of piston rod 40a is different from a value corresponding to its requested position, steering valve 41 is set to either extension position $E_{41}$ or contraction position $C_{41}$, and if it becomes no further different, steering valve 41 is returned to neutral position $N_{41}$ by springs.

By exciting solenoid 41a, steering valve 41 is located at extension position $E_{41}$, where port 40b is connected to pump 42, and port 40c to tank 43, thereby extending piston rod 40a. By exciting solenoid 41b, steering valve 41 is located at contraction position $C_{41}$, where port 40c is connected to pump 42, and port 40b to tank 43, thereby contracting piston rod 40a. When neither solenoid 41a nor 41b is excited, steering valve 41 is set at neutral position $N_{41}$ so as to block both ports 40b and 40c, thereby stopping piston rod 40a.

Steering wheel 14 is manually turned from a straight traveling position S14 either rightward in a right turning range RT14 or leftward in a left turning range LT14. A switch 14a inputs a detected positional signal of steering wheel 14 to controller 44. An actual stroke of piston rod 40a or another actual value corresponding to an actual stroke of piston rod 40a, e.g., an actual rotational angle of sleeve 39, is detected. Based on a difference of actual stroke of piston rod 40a from a stroke of piston rod 40a corresponding to the detected rotational position of steering wheel 14, controller 44 outputs an exciting signal to one of solenoids 41a and 41b of steering valve 41 and stops the output so as to switch steering valve 41 between neutral position $N_{41}$ and either position $E_{41}$ or $C_{41}$, thereby telescoping and stopping piston rod 40a. Therefore, in correspondence to the rotational position of steering wheel 14, sleeve 39 is rotationally located together with levers 17R and 17L so as to locate swash plates 19a of right and left hydraulic pumps 19 to appropriate slant angles and directions.

It is temporarily assumed that a signal value with respect to a stroke of piston rod 40a is zero when the stroke is a neutral stroke corresponding to the rotational position of steering wheel 14 in straight traveling position S14, that the signal value is increased in a positive range from zero when piston rod 40a is extended from the neutral stroke, and that the signal value is decreased in a negative range from zero when piston rod 40a is contracted from the neutral stroke. When forward traveling sensing switch 35F is turned on and steering wheel 14 is rotationally located at a position, controller 44 calculates a positive signal value in correspondence to the position of steering wheel 14. On this assumption, if rearward traveling sensing switch 35R is turned off and steering wheel 14 is rotationally located at the same position, controller 44 calculates a negative signal value of the same volume with the positive signal value calculated when forward traveling sensing switch 35F is turned on. In other words, piston rod 40a, which is extended to a degree from the neutral stroke during forward traveling of the vehicle, is contracted to the same degree from the neutral stroke during rearward traveling of the vehicle. Similarly, in correspondence to a rotational position of steering wheel 14, piston rod 40a, which is contracted to a degree from the neutral stroke during forward traveling of the vehicle, is extended to the same degree from the neutral stroke during rearward traveling of the vehicle.

Movement of speed control levers 17L and 17R will now be remarked. When setting forward straight traveling of the vehicle, shaft 38 and sleeve 39 are located at any position in forward traveling range F, and both bars 39a are extended laterally in direction S so as to locate speed control levers 17L and 17R fowardly slantwise in the same angle. At this time, left and right drive wheels 5L and 5R rotate forward at equal speed. Next, assume that steering wheel 14 is turned to a certain rotational position in left turning range $LT_{14}$. The stroke of piston rod 40a is increased to a certain degree from the neutral stroke so as to rotate sleeve 39 counterclockwise around shaft 38 and rotate bars 39a in ranges LT, whereby left speed control lever 17L is rotated rearward, and right speed control lever 17R forward, that is, they are symmetrically rotated from their above-mentioned initial position set for forward straight traveling when viewed along the common pivot of levers 17L and 17R. Accordingly, forward rotating left drive wheel 5L is decelerated, and forward rotating right drive wheel 5R is accelerated so as to compensate for the reduced speed of left drive wheel 5L, whereby the forward traveling vehicle turns left.

On the other hand, when setting rearward straight traveling of the vehicle, shaft 38 and sleeve 39 are located at any position in rearward traveling range R, and both bars 39a are extended laterally in direction S so as to locate speed control levers 17L and 17R rearwardly slantwise in the same angle. At this time, left and right drive wheels 5L and 5R rotate rearward at equal speed. Next, assume that steering wheel 14 is turned to the certain rotational position in left turning range $LT_{14}$, which is the same with the above-mentioned certain position of steering wheel 14 when setting forward traveling. The stroke of piston rod 40a is reduced from the neutral stroke to a certain degree as much as the above-mentioned increased degree thereof when setting forward traveling so as to rotate sleeve 39 clockwise around shaft 38 and rotate bars 39a in ranges RT, whereby left speed control lever 17L is rotated forward, and right speed control lever 17R rearward, that is, they are symmetrically rotated from their above-mentioned initial position set for rearward straight traveling when viewed along the common pivot of levers 17L and 17R. Accordingly, rearward rotating left drive wheel 5L is decelerated, and rearward rotating right drive wheel 5R is accelerated so as to compensate for the reduced speed of left drive wheel 5L, whereby the rearward traveling vehicle turns left.

In this way, by rotating steering wheel 14 leftward from straight traveling position $S_{14}$, the vehicle turns left whether the vehicle travels forward or rearward. The same is true when steering wheel 14 is rotated rightward from straight traveling position $S_{14}$. Consequently, the rotational direction of steering wheel 14 from straight traveling position $S_{14}$ agrees with turning direction of the vehicle whether the vehicle travels forward or rearward.

Hydraulic pump 42 serves as a common hydraulic pressure source for hydraulic cylinder 40 and differential-locking clutch 24. On a hydraulic oil circuit between hydraulic pump 42 and differential-locking clutch 24 is provided a two-positioned spring-loaded electromagnetic differential-locking valve 60 which is switched between positions I and II. Controller 44 controls the location of differential-locking valve 60 in association with operation of steering wheel 14.

When steering wheel 14 is set in straight traveling position $S_{14}$, differential-locking valve 60 is automatically located in position I so as to engage differential-locking clutch 24, thereby rotating right and left drive wheels 5R and 5L at the perfectly same speed, whereby the vehicle accurately travels straight. Even if the vehicle is on a slope and such an unexpected accident as engine or electric power failure occurs, right and left drive wheels 5R and 5L are locked together so as to keep the vehicle in safety.

When steering wheel 14 is rotated right or left from straight traveling position $S_{14}$ so as to turn the vehicle, controller 44 excites a solenoid of differential-locking valve 60 so that differential-locking valve 60 is located at position II to disengage differential-locking clutch 24, thereby enabling right and left drive wheels 5R and 5L to rotate differentially. Preferably, in consideration of such a case that the vehicle is mired at one of drive wheels 5R and 5L in a ditch, differential-locking valve 60 may be optionally held at position I by manual operation so as to engage differential-locking clutch 24 whether steering wheel 14 is located at straight traveling position $S_{14}$ or not, thereby enabling the vehicle to escape from the ditch.

FIG. 7 illustrates that transmission housing 3 contains a modification of the transmission system of FIG. 5. A reverser 50 is constituted among primary input shaft 11 and pump shafts 19b. Each of bevel gears 51 and 52 is relatively rotatably provided on primary input shaft 11 and meshes with both HST input gears 19c fixed on proximal ends of respective pump shafts 19b. A hydraulically controlled reversal clutch 53 for selecting either normal or reversed rotation of pump shafts 19b is disposed on primary input shaft 11 between bevel gears 51 and 52. Clutch 53 is supplied with oil so as to fix either bevel gear 51 or 52 to primary input shaft 11. Which direction pump shafts 19b are rotated in depends upon which bevel gear 51 or 52 is fixed to primary input shaft 11 by reversal clutch 53. When oil is not supplied to clutch 53, hydraulic pumps 19 of both right and left HSTs 18R and 18L are stopped.

Incidentally, brake 25 is provided on each motor shaft 20b between fixed swash plate 20a and gear 20c. Alternatively, such an arrangement of brakes 25 as shown in FIG. 5 may be employed.

FIG. 8 illustrates that transmission housing 3 contains a further modification of the transmission system of FIG. 5, comprising a pair of reversers 50, each of which is interposed between motor shaft 20b of each of HST 18L and 18R and each of drive axles 27 (drive wheels 5L and SR). Primary input shaft 11 and input shafts 19b interlock with one another through bevel gear 22 and HST input gears 19c so that the rotational direction of pump shafts 19b is fixed.

Left and right counter shafts 26 are extended toward each other so as to be mutually connected or disconnected through differential-locking clutch 24, which is not interposed between left and right motor shafts 20b but interposed between left and right counter shafts 26.

An idler shaft 54 is interposed between each motor shaft 20b and each counter shaft 26. Idler shaft 54 always engages with motor shaft 20b through gears 20c and 54a. Gears 26d and 26e are relatively rotatably provided on counter shaft 26. Hydraulically controlled reversal clutch 53 is disposed on each of left and right counter shafts 26 between gears 26d and 26e so as to selectively engage either gear 26d or 26e with counter shaft 26. Gear 26d always meshes with gear 20c fixed on motor shaft 20b. Gear 26e always meshes with another gear 54b fixed on idler shaft 54. Gears 20c and 26d constitute a normal gear train for rotating counter shaft 26 in one of opposite directions, i.e., a normal direction. Gears 20c, 54a, 54b and 26e constitute a reversing gear train for rotating counter shaft 26 in the other direction, i.e., a reversed direction.

Basically, left and right clutches 53 opposed with respect to differential-locking clutch 24 are operated simultaneously so that, between both HSTs 18L and 18R and both drive axles 27, both the normal gear trains are selected simultaneously, or alternatively, both the reversing gear trains are selected simultaneously. By stopping oil supply to reversal clutch 53, left and right drive wheels 5L and SR are stopped even if left and right HSTs 18L and 18R actuate.

Incidentally, brake 25 is disposed on each counter shaft 26. Further, in each of HSTs 18L and 18R, hydraulic motor 20 with fixed swash plate 20a is mounted to one surface of center section 21 which is opposite to another surface of center section 21 for mounting hydraulic pump 19 thereon. Thus, a space for arranging reverser 50 and the normal and reversing gear trains is ensured among motor shaft 20b and counter shafts 26 and 54.

In any of reversers 50 shown in FIGS. 7 and 8, each reversal clutch 53 includes an oil chamber 53a for normal rotation and an oil chamber 53b for reversed rotation, as shown in FIG. 9. Regarding reversal clutch 53 shown in FIG. 7, oil chamber 53a is supplied with pressure oil to fix one of bevel gears 51 and 52 to primary input shaft 11 so as to rotate pump shafts 19b in the normal direction corresponding to forward traveling of the vehicle. Oil chamber 53b is supplied with pressure oil to fix the other of bevel gears 51 and 52 to primary input shaft 11 so as to rotate pump shafts 19b in the reversed direction corresponding to rearward traveling of the vehicle. Regarding clutches 53 shown in FIG. 8, oil chambers 53a are supplied with pressure oil to engage bevel gears 26e with respective counter shafts 26 so as to transmit output power of HSTs 18L and 18R to the normal gear trains. Oil chambers 53b are supplied with pressure oil to engage bevel gears 26d with respective counter shafts 26 so as to transmit output power of HSTs 18L and 18R to the reversing gear trains.

Such arrangement of reverser 50 or reversers 50 on the upstream or downstream of twin transmissions for respective drive wheels represented by left and right HSTs 18L and 18R is applied for combination of the twin transmissions with a transmission, whose output rotation is nonreversible, such as a variable electric motor or a frictional mechanical continuous variable transmission (CVT) having a toroidal belt or another means. Furthermore, the vehicle may have means for unclutching the reverser or reversers 50 so as to stop right and left drive wheels SR and 5L simultaneously at need.

Description will be given of a control system of HSTs 18L and 18R shown in FIG. 9, which is adapted to the respective transmission systems shown in FIG. 7 and FIG. 8. As the system of FIG. 9 serves as a modification of the control system of HSTs 18L and 18R shown in FIG. 6, description of parts and devices shown in FIG. 9, which are identical with those in FIG. 6 and marked with the same reference numerals of those in FIG. 6, will be omitted.

Referring to FIG. 9, a steering valve 41, a reverser valve 55 and differential-locking valve 60 are supplied in parallel with oil from pump 42. Steering wheel 14 is mechanically linked with steering valve 41, through which ports 40$b$ and 40$c$ of cylinder 40 are fluidly connected to pump 42 and tank 43. Therefore, the different point from the case with steering valve 41 of FIG. 6 is that the stroke of piston rod 40$a$, i.e., the rotational direction of sleeve 39 around shaft 38 is constant in relation to the left or right rotational direction of steering wheel 14 from the straight traveling position $S_{14}$ whether the vehicle travels forward or rearward. That is, whether the vehicle travels forward or rearward, steering valve 41 alters the leftward rotation of steering wheel 14 from straight traveling position $S_{14}$ into proportional extension of piston rod 40$a$ from the neutral stroke causing bars 39$a$ to rotate in ranges LT so as to push left lever 19L rearward and pull right lever 19R forward, and it alters the rightward rotation of steering wheel 14 from straight traveling position $S_{14}$ into proportional contraction of piston rod 40$a$ from the neutral stroke causing bars 39$a$ to rotate in ranges RT so as to pull left lever 19L forward and push right lever 19R rearward.

Furthermore, both pedals 33 and 34 have respective upwardly projecting arms 33$a$ and 34$a$, to which links 45 and 46 extended from shaft 38 are connected. Therefore, whichever pedal 33 or 34 is depressed, shaft 38 and sleeve 39 are tilted only forward in forward traveling range F from neutral position N to maximum forward traveling speed position Fm, that is, swash plates 19$a$ of both hydraulic pumps 19 are rotated in only their ranges which are essentially provided for forward traveling of the vehicle.

Consequently, the leftward rotation of steering wheel 14 from straight raveling position $S_{14}$ necessarily reduces the capacity of left hydraulic pump 19 so as to decelerate left drive wheel 5L, and increases the capacity of right hydraulic pump 19 so as to accelerate right drive wheel 5R, thereby causing a left turn of the vehicle. The rightward rotation of steering wheel 14 from straight traveling position $S_{14}$ necessarily increases the capacity of left hydraulic pump 19 so as to accelerate left drive wheel 5L, and reduces the capacity of right hydraulic pump 19 so as to decelerate right drive wheel 5R, thereby causing a right turn of the vehicle. Therefore, whether the vehicle travels forward or rearward does not depend upon positional control of swash plates 19$a$ of hydraulic pumps 19 but needs to depend upon other means for switching the rotational direction of drive wheels 5L and 5R between forward and rearward directions.

As means for changing the rotational direction of drive wheels 5L and 5R, reverser valve 55 is a three-positioned electromagnetic solenoid valve, which has opposite directive solenoids 55$a$ and 55$b$ and is switched among a neutral position $N_{55}$ and other two positions $F_{55}$ and $R_{55}$, and interposed between pump 42 and oil chambers 53$a$ and 53$b$ of reversal clutch 53.

Description will now be given of the case where the transmission system shown in FIG. 7 is associated with the control system shown in FIG. 9. For forward straight traveling of the vehicle, forward traveling shift pedal 33 is depressed together with switch 35F and steering wheel 14 is located in straight traveling position $S_{14}$. Controller 44 receives the depression signal from switch 35F and excites solenoid 55$a$ so as to locate reverser valve 55 to position $F_{55}$, thereby connecting chamber 53$a$ to pump 42 and connecting chamber 53$b$ to tank 43, whereby bevel gear 51 is fixed to primary input shaft 11 so as to rotate pump shafts 19$b$ in the normal direction. Therefore, hydraulic motors 20 are rotated in one direction such as to drive the vehicle forward.

For rearward straight traveling of the vehicle, rearward traveling shift pedal 34 is depressed together with switch 35R and steering wheel 14 is located in straight traveling position $S_{14}$. Controller 44 receives the depression signal from switch 35R and excites solenoid 55$b$ so as to locate reverser valve 55 to position $R_{55}$, thereby connecting chamber 53$b$ to pump 42 and connecting chamber 53$a$ to tank 43, whereby bevel gear 52 is fixed to primary input shaft 11 so as to rotate pump shafts 19$b$ in the reversed direction. Therefore, hydraulic motors 20 are rotated in the opposite direction such as to drive the vehicle rearward.

As shown in FIG. 9, shaft 38 is tilted only forward in forward traveling range F whichever pedal 33 or 34 is depressed. That is, movable swash plate 19$a$ of each hydraulic pump 19 can be tilted to only one side for forward traveling from its neutral position so that each hydraulic motor 20 is essentially rotated in only one direction for forward traveling at variable speed. However, when pedal 34 is depressed, reverser 50 is changed so as to reverse the flow of fluid between pump 19 and motor 20, thereby reversing the rotational direction of motor 20 for rearward traveling.

Incidentally, if neither pedal 33 nor 34 is depressed, controller 44 locates reverser valve 55 to shown neutral position $N_{55}$ so as to drain oil from both chambers 53$a$ and 53$b$ in reversal clutch 53 to tank 43, whereby left and right HSTs 18L and 18R do not actuated and power transmission to left and right drive wheels 5L and 5R is perfectly shut down.

When steering wheel 14 is rotated rightward or leftward from straight traveling position $S_{14}$, switch 14$a$ sends controller 44 a signal meaning that steering wheel 14 is rotated apart from straight traveling position $S_{14}$. Therefore, controller 44 switches differential valve 60 to position II so as to disengage differential-locking clutch 24, similarly with that of FIG. 6, so that right and left hydraulic motors 20 are allowed to rotate freely from each other.

In this embodiment, steering valve 41 is a spring-center hydraulic change-over valve mechanically linked with steering wheel 14. Then, according to rotation of steering wheel 14 from straight traveling position $S_{14}$, steering valve 41 is changed from a neutral position $N_{41}$ to either an extension position $E_{41}$ or a contraction position $C_{41}$ so as to telescope piston rod 40$a$. When the stroke of piston rod 40$a$ of hydraulic cylinder 40 becomes correspondent to the rotational position of steering wheel 14, steering valve 41 returns to neutral position $N_{41}$ by springs. Therefore, speed control levers 17R and 17L are rotated in mutually opposite directions so as to differentially rotate right and left drive wheels 5R and 5L.

By returning steering wheel 14 to straight traveling position $S_{14}$, the stroke of piston rod 40a becomes the neutral stroke. At this time, bars 39a are oriented in direction S so as to equalize directions and angles of speed control levers 17L and 17R, thereby equalizing rotational directions and speeds of hydraulic motors 20. Furthermore, switch 14a sends controller 44 a signal meaning that steering wheel 14 is set in straight traveling position $S_{14}$, so that controller 44 switches differential locking valve 60 to position I so as to engage differential-locking clutch 24. Therefore, the vehicle travels perfectly straight.

It is assumed that steering wheel 14 is rotated leftward in left turning range $LT_{14}$ from straight traveling position $S_{14}$. In this case, steering valve 41 connects port 40b to pump 42, and connects port 40c to tank 43 so as to rotate sleeve 39 clockwise around shaft 38 and rotate bars 39a in ranges LT, whereby left link 16L pushes left speed control lever 17L, and right link 16R pulls right speed control lever 17R. At this time, when forward traveling shift pedal 33 is depressed so as to fix bevel gear 51 to primary input shaft 11, pulled right lever 17R causes right HST 18R to accelerate forwardly rotating right drive wheel 5R, and pushed left lever 17L causes left HST 18L to decelerate forwardly rotating left drive wheel 5L. On the contrary, if rearward traveling shift pedal 34 is depressed in the assumed leftward rotated state of the steering wheel 14, switch 35R is switched on so as to fix bevel gear 52 to primary input shaft 11. Therefore, right lever 17R is pulled so as to cause right HST 18R to accelerate rearwardly rotating right drive wheel 5R, and left lever 17L is pushed so as to cause left HST 18L to decelerate rearwardly rotating left drive wheel 5L. Consequently, when steering wheel 14 is rotated leftward from straight traveling position $S_{14}$, right drive wheel 5R is accelerated, and left drive wheel 5L is decelerated, so that the vehicle turns left whether it travels forward or rearward. When steering wheel 14 is rotated rightward in right turning range $RT_{14}$ from straight traveling position $S_{14}$, vise versa. In this case, steering valve 41 contracts piston rod 40a from the neutral stroke so as to pull left lever 17L forward and push right lever 17R rearward.

Description will now be given of the case where the transmission system shown in FIG. 8 is associated with the control system shown in FIG. 9. For straight traveling of the vehicle, forward traveling shift pedal 33 is depressed together with switch 35F, and steering wheel 14 is located at straight traveling position $S_{14}$. Based on depression of switch 35F, controller 44 excites solenoid 55a of reverser valve 55 so as to locate reverser valve 55 at position $F_{55}$ for setting each of reversal clutches 53 into a state where chamber 53a is connected to pump 42 and chamber 53b is connected to tank 43, thereby fixing gears 26d to respective counter shafts 26, i.e., selecting the normal gear trains for rotating counter shafts 26 opposite to respective motor shafts 20b.

When rearward traveling shift pedal 34 is depressed together with switch 35R, controller 44 excites solenoid 55b of reverser valve 55 based on the depression of switch 35R so as to locate reverser valve 55 at position $R_{55}$ for setting each of reversal clutches 53 into a state where chamber 53a is connected to tank 43 and chamber 53b is connected to pump 42, thereby fixing gears 26e to respective counter shafts 26, i.e., selecting the reversing gear trains for rotating counter shafts 26 in the same rotational direction with respective motor shafts 20b.

Whether pedal 33 or 34 is depressed, shaft 38 and sleeve 39 are tilted only forward in forward traveling range F so that, in each of HSTs 18L and 18R, movable swash plate 19a of pump 19 is rotated to only one side from its neutral position so as to accelerate or decelerate output rotation of motor 20 in a constant direction for essential forward rotation of drive wheels 5R and 5L. However, by depressing rearward traveling shift pedal 34, reversers 50 actuate to rotate drive wheels 5R and 5L rearward while the output rotational direction of motors 20 is still constant.

When none of pedals 33 and 34 is depressed, controller 44 sets reverser valve 55 at neutral position $N_{55}$ as to drain oil from both chambers 53a and 53b of reversal clutch 53 to tank 43. Therefore, both right and left drive wheels 5R and 5L are perfectly isolated from power transmission even if neutral location of at least one HST 18R or 18L is inaccurately adjusted and a slight output arises from the HST 18R or 18L.

It is assumed that steering wheel 14 is rotated leftward in left turning range $LT_{14}$ from straight traveling position $S_{14}$. At this time, steering valve 41 connects port 40b to pump 42, and connects port 40c to tank 43, thereby extending piston rod 40a from the neutral stroke, whereby left link 16L pushes left lever 17L rearward and right link 16R pulls right lever 17R forward. When pedal 33 is depressed, switch 35F is switched on so as to fix gears 26d to respective counter shafts 26, pulled right lever 17R makes right HST 18R accelerate forwardly rotating right drive wheel 5R, and pushed left lever 17L makes left HST 18L decelerate forwardly rotating left drive wheel 5L. When pedal 34 is depressed, switch 35R is switched on so as to fix gears 26e to respective counter shafts 26, pulled right lever 17R makes right HST 18R accelerate rearwardly rotating right drive wheel 5R, and pushed left lever 17L makes left HST 18L decelerate rearwardly rotating left drive wheel 5L.

Consequently, when steering wheel 14 is turned left from straight traveling position $S_{14}$, right drive wheel 5R is accelerated and left drive wheel 5L is decelerated, or if left drive wheel 5L is rotated opposite to right drive wheel 5R, left drive wheel 5L is accelerated, so that the vehicle turns left whether it travels forward or rearward. The same is true when steering wheel 14 is turned rightward in right turning range $RT_{14}$ from straight traveling position $S_{14}$. In this case, steering valve 41 contracts piston rod 40a from the neutral stroke so as to pull left lever 17L forward and push right lever 17R rearward.

An operation system shown in FIG. 10 is adapted for a vehicle transmission system having any of reversers 50 shown in FIGS. 7 and 8, which is not operated based on turning of a switch provided on a traveling shift pedal as shown in FIG. 9, but is manually operable with a mechanical link. A reverser valve 55 is mechanically linked with a reverser lever (not shown) provided in a driver's portion of a vehicle. Accordingly, only a single pedal 33 serves as an operation device for changing traveling speed of the vehicle. A pressure-sensing switch 35 is provided on a depressed surface of pedal 33.

A clutch valve 61, which is electro-magnetically controlled by controller 44 based on ON/OFF signal from switch 35, is interposed among reverser valve 55, pump 42 and tank 43. When pedal 33 is not depressed and switch 35 is turned off, clutch valve 61 is located at a shown position $I_{61}$ so that any reversal clutch 53 having oil chambers 53a and 53b, from which oil is drained to tank 43, is unclutched wherever reverser valve 55 is located. If pedal 33 is depressed, reverser valve 61 is shifted to a position $II_{61}$ so as to be applied for supplying oil to either oil chamber 53a or 53b in any reversal clutch 53 through reverser valve 55.

According to setting the above-mentioned reverser lever to either a forward traveling position or a rearward traveling position, reverser valve 55 is set to either forward traveling position $F_{55}$ or rearward traveling position $R_{55}$. The forward tilt angle of sleeve 39 is changed according to depression of pedal 33 so as to equally change the capacities of both left and right hydraulic pumps 19, thereby changing the traveling speed of a vehicle.

When steering wheel 14 is rotated rightward or leftward from straight traveling position $S_{14}$, hydraulic cylinder 40 telescopes piston rod 40a so as to rotate sleeve 39 around shaft 38. Therefore, the capacity of hydraulic pump 19 on one side of the vehicle corresponding to the rotational direction of steering wheel 14 is reduced so as to reduce the output power of hydraulic motor 20 fluidly connected thereto, thereby decelerating corresponding drive wheel 5L or 5R. Simultaneously, the capacity of hydraulic pump 19 on the other side of the vehicle opposite to the rotational direction of steering wheel 14 is relatively increased so as to increase the output power of hydraulic motor 20 fluidly connected thereto, thereby accelerating corresponding drive wheel 5R or 5L.

Reverser (or reversers) 50 maintains the relation of deceleration and acceleration of drive wheels 5L and 5R to rotational direction of steering wheel 14 so as to coincide turning direction of the vehicle to the rotational direction of steering wheel 14 whether the vehicle travels forward or rearward.

Referring to FIG. 11, reverser 50 is interposed between primary input shaft 11 and pump shafts 19b, similarly with FIG. 7. However, reverser 50 shown in FIG. 11 is provided with a mechanical reversal dog clutch 53' instead of hydraulic reversal clutch 53. Clutch 53' is provided with a clutch slider 53'a, which is not relatively rotatably but axially slidably disposed on primary input shaft 11 so as to selectively engage with one of opposite bevel gears 51 and 52 freely rotatably provided on primary input shaft 11. Clutch slider 53'a is mechanically linked with a reverser lever (with reference to a reverser lever 72 shown in FIG. 12) provided in a driver's portion of a vehicle.

By manual operating the reverser lever, clutch slider 53'a of reversal clutch 53' slides on primary input shaft 11 and engages with one of bevel gears 51 and 52 so as to rotate pump shafts 19b in either one direction for forward traveling or the other direction for rearward traveling. In addition, clutch slider 53'a may be disengaged from both bevel gears 51 and 52 so that reversal clutch 53' may be unclutched to isolate both pump shafts 19b from rotational force of primary input shaft 11.

A main clutch 71, which may be integrally provided on output pulley 9 as shown in FIG. 11, is temporarily disengaged to isolate primary input shaft 11 from power of engine 2 before switching reversal clutch 53'. Main clutch 71 may be electro-magnetically controlled so as to be automatically switched depending upon whether later-discussed traveling shift pedal 33 is depressed or not, for example.

Referring to FIG. 12, reversers 50 are provided on respective counter shafts 26 on the downstream of respective hydraulic motors 20, similarly with FIG. 8. However, reversers 50 shown in FIG. 12 are provided with respective mechanical reversal dog clutches 53' instead of hydraulic reversal clutches 53. Each reversal clutch 53' is provided with a clutch slider 53'a, which is not relatively rotatably but axially slidably disposed on counter shaft 26 so as to selectively engage with one of opposite gears 26d and 26e freely rotatably provided on counter shaft 26. Both clutch sliders 53'a are engaged to a common fork shaft 53'b through respective forks 53'c. Fork shaft 53'b is mechanically linked with a reverser lever 72 provided in a driver's portion of a vehicle.

By manual operating reverser lever 72, both clutch sliders 53'a of reversal clutches 53' slide on respective counter shafts 26 and engage with either gears 26d or 26e so as to rotate counter shafts 26 in either one direction for forward traveling or the other direction for rearward traveling. In addition, each clutch slider 53'a may be disengaged from both gears 26d and 26e so that both reversal clutches 53' may be unclutched to isolate counter shafts 26 from rotational force of motor shafts 20b.

Main clutch 71, which may be integrally provided on output pulley 9 as shown in FIG. 12, is temporarily disengaged to isolate primary input shaft 11 from power of engine 2 before switching reversal clutches 53'. Main clutch 71 may be electro-magnetically controlled so as to be automatically switched depending upon whether later-discussed traveling shift pedal 33 is depressed or not, for example.

FIG. 13 illustrates a structure with electric and hydraulic circuits for controlling tilt angles of swash plates 19a of left and right hydraulic pumps 19, which is adapted for each of the transmission systems of FIGS. 11 and 12, and functions similarly with the structure of FIG. 10. When pressure-sensing switch 35 detects depression of single traveling shift pedal 33, controller 44 electro-magnetically controls main clutch 71 to engage. Either forward or rearward traveling direction of the vehicle is determined by setting mechanical reverser 50. While the vehicle travels in the set forward or rearward direction, the forward tilt angle of sleeve 39 with shaft 38 is changed according to depression of pedal 33 so as to change the capacities of left and right hydraulic pumps 19, thereby changing traveling speed of the vehicle.

When steering wheel 14 is rotated leftward or rightward from straight traveling position $S_{14}$, piston rod 40a of hydraulic cylinder 40 is telescoped so as to rotate sleeve 39 around shaft 38, whereby the capacity of hydraulic pump 19 on one side of the vehicle corresponding to the rotational direction of steering wheel 14 is reduced so as to decelerate corresponding drive wheel 5L or 5R, and the capacity of hydraulic pump 19 on the other side of the vehicle opposite to the rotational direction of steering wheel 14 is increased so as to accelerate corresponding drive wheel 5R or 5L. Reverser (or reversers) 50 maintains the relation of deceleration and acceleration of drive wheels 5L and 5R to rotational direction of steering wheel 14 so as to coincide turning direction of the vehicle to the rotational direction of steering wheel 14 whether the vehicle travels forward or rearward.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A vehicle, comprising:
   a prime mover;
   a pair of drive wheels;
   a pair of transmissions for driving said respective drive wheels;
   a traveling operation device for setting a traveling speed of said vehicle and selecting a traveling direction of said vehicle between forward and rearward directions, wherein said traveling operation device is operationally connected with said pair of transmissions so as to drive said drive wheels at a common speed and in a common direction;

a steering wheel for turning said vehicle leftward or rightward, wherein said steering wheel is operationally connected with said pair of transmissions;

switching means for switching said traveling direction of said vehicle between forward and rearward directions based on the traveling direction selected by said traveling operation device;

a reversing means provided to said pair of transmissions so as to reverse driving directions of said respective drive wheels in correspondence to the switching operation of said switching means, so that, when said steering wheel is rotated, one of said drive wheels at the same side of said vehicle with the rotation direction of said steering wheel is decelerated and the other of said drive wheels at the opposite side of said vehicle to the rotation direction of said steering wheel is accelerated regardless of whether said traveling operation device selects said forward direction or said rearward direction;

a common input shaft shared between said transmissions to receive power of said prime mover; and a pair of input shafts of said respective transmissions, wherein said reversing means extends between said common input shaft and said pair of input shafts of said respective transmissions.

2. A vehicle, comprising:
a prime mover;
a pair of drive wheels;
a pair of transmissions for driving said respective drive wheels;

a traveling wheel for setting a traveling speed of said vehicle and selecting a traveling direction of said vehicle between forward and rearward directions, wherein said traveling wheel is operationally connected with said pair of transmissions so as to drive said drive wheels at a common speed and in a common direction;

a steering wheel for turning said vehicle leftward or rightward, wherein said steering wheel is operationally connected with said pair of transmissions;

switching means for switching said traveling direction of said vehicle between forward and rearward directions based on the traveling direction selected by said traveling operation device;

a pair of reversing means provided one to each of said pair of transmissions so as to reverse driving directions of said respective drive wheels in correspondence to the switching operation of said switching means, so that, when said steering wheel is rotated, one of said drive wheels at the same side of said vehicle with the rotation direction of said steering wheel is decelerated and the other of said drive wheels at the opposite side of said vehicle to the rotation direction of said steering wheel is accelerated regardless of whether said traveling operation device selects said forward direction or said rearward direction;

a pair of output shafts of said respective transmissions, wherein each of said reversing means is interposed between one of said output shafts and one of said drive wheels; and a differential-locking clutch interposed between said pair of reversing means.

* * * * *